United States Patent [19]
Minami et al.

[11] 3,962,009
[45] June 8, 1976

[54] DECORATIVE LAMINATED STRUCTURES AND METHOD OF MAKING SAME

[75] Inventors: Kazuto Minami, Tokyo; Norihiko Tsukui, Higashikurume; Tsunehiko Imamoto, Funabashi, all of Japan

[73] Assignee: Dai Nippon Printing Company Limited, Tokyo, Japan

[22] Filed: Dec. 11, 1972

[21] Appl. No.: 313,661

[30] Foreign Application Priority Data
Dec. 11, 1971 Japan.............................. 46-99866
Jan. 13, 1972 Japan.............................. 47-05564
Apr. 14, 1972 Japan.............................. 47-37600
May 27, 1972 Japan.............................. 47-52168

[52] U.S. Cl................................ 156/85; 101/426; 156/59; 156/229; 156/272; 156/277; 264/230; 264/342 R; 427/55; 428/15; 428/151; 428/910; 428/913
[51] Int. Cl.$^2$......................................... B32B 31/26
[58] Field of Search ................... 156/58, 59, 61, 84, 156/85, 272, 277, 224; 117/3.2, 93.3, 37 R, 45; 161/6, 19, 138, 412, 413, 164; 264/342 R, 230; 101/426

[56] References Cited
UNITED STATES PATENTS

| | | | |
|---|---|---|---|
| 3,159,525 | 12/1964 | Finger | 156/85 |
| 3,280,735 | 10/1966 | Clark et al. | 101/470 |
| 3,554,827 | 1/1971 | Yamagishi | 156/85 |
| 3,558,395 | 1/1971 | Plegat | 156/277 |
| 3,575,755 | 4/1971 | Cutler et al. | 156/85 |
| 3,578,521 | 5/1971 | Evans | 156/85 |
| 3,582,426 | 6/1971 | Meissner | 156/277 |
| 3,725,184 | 4/1973 | Scopp | 161/6 |
| 3,745,059 | 7/1973 | Kubo et al. | 161/165 |
| 3,751,318 | 8/1973 | Newman | 156/272 |
| 3,823,046 | 7/1974 | Yamagishi | 156/85 |

*Primary Examiner*—Edward G. Whitby
*Attorney, Agent, or Firm*—Armstrong, Nikaido & Wegner

[57] ABSTRACT

A decorative laminated structure having on its surface a pattern composed of concaves and convexes which are formed by local heat shrinkages of a layer of a heat-shrinkable resin sheet employed. Such decorative laminated structure can be obtained by laying a base, a heat-shrinkable resin sheet and a picture layer containing at least a plurality of heat sensitive picture areas in a predetermined order to form a composite material, said heat sensitive picture areas being contiguous and closely adherent to said heat-shrinkable resin sheet; and irradiating the resulting composite material with a heat ray to cause said heat-shrinkable resin sheet at its portions corresponding to said heat sensitive picture areas to cave in, thus forming concaves. The present decorative laminated structure has, alone or in combination with the other structures, a wide variety of uses, for example, not only as a material for a ceiling, a floor, a wall and/or an interior decoration of a building, car, ship and the like but also as a decorative material for furnitures, fittings, tables, musical instruments, cabinets and the like.

32 Claims, 38 Drawing Figures

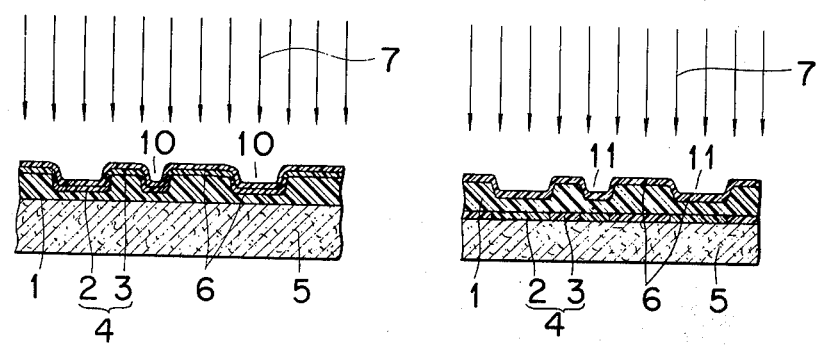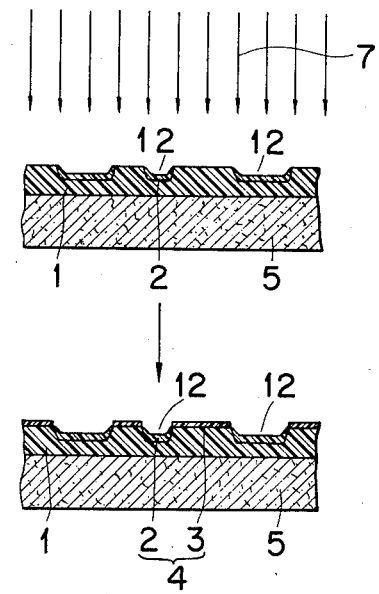

FIG. 28
FIG. 30
FIG. 29
FIG. 31
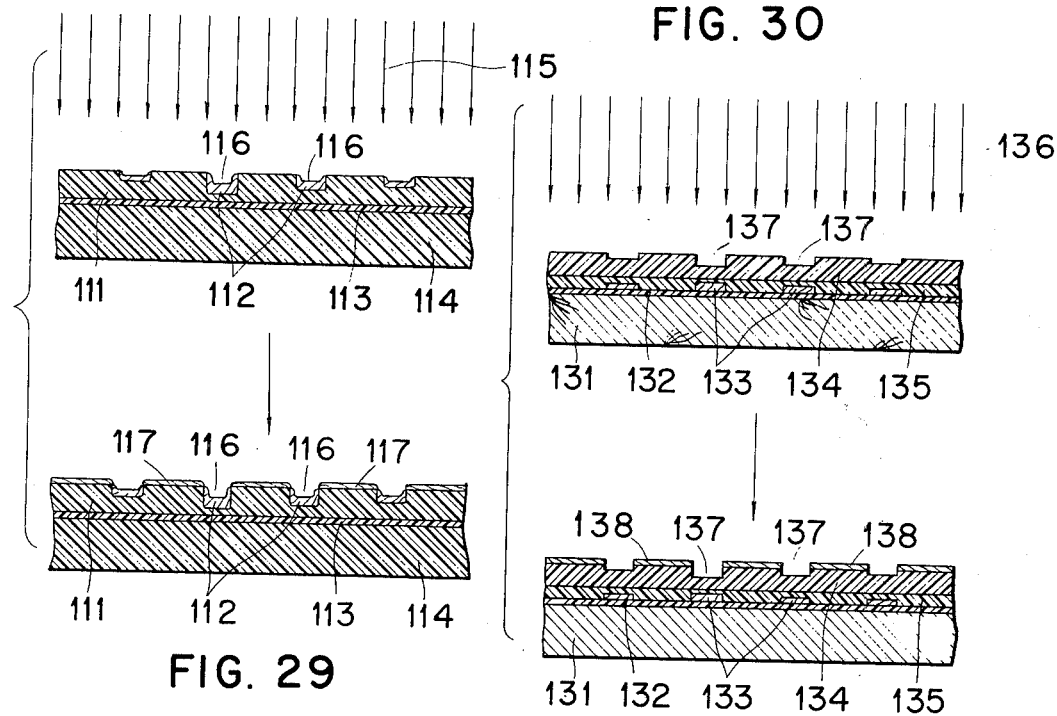
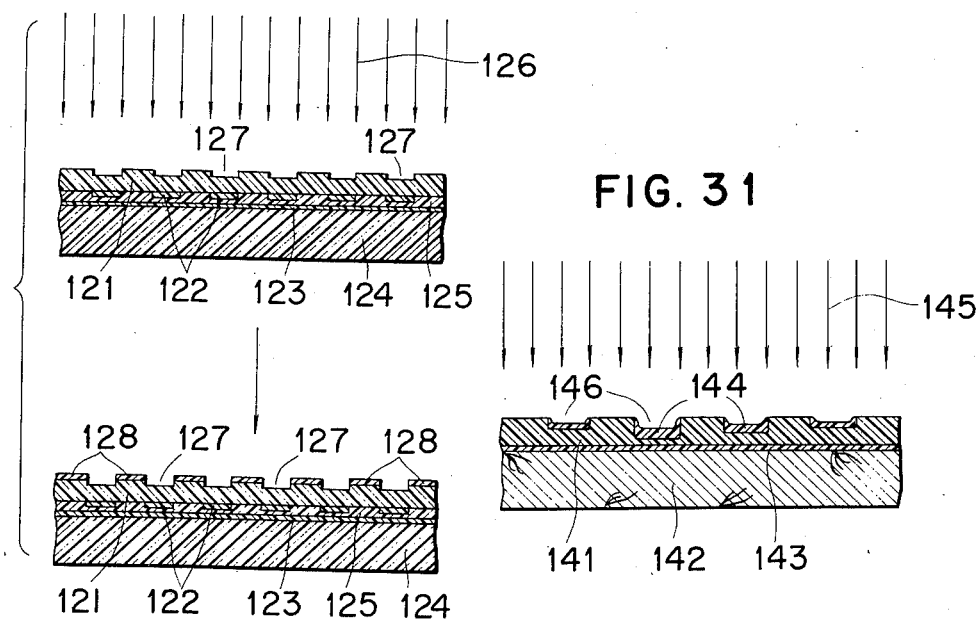

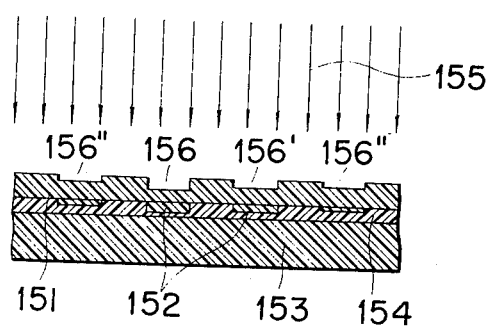
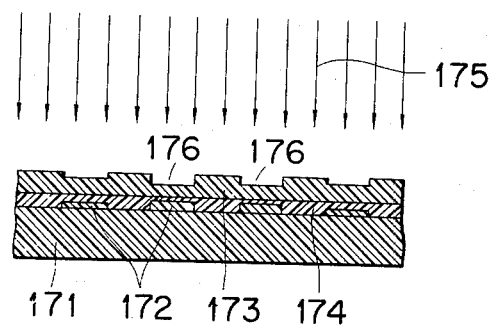
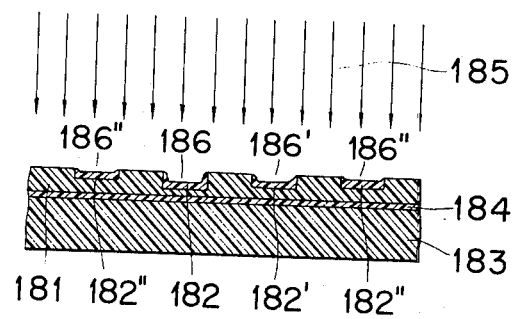
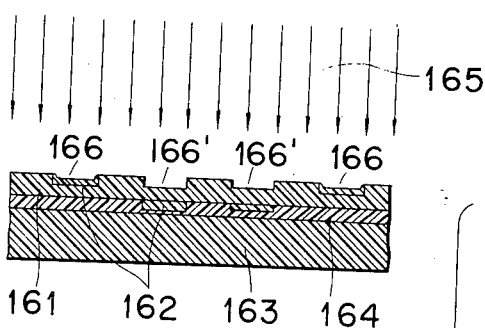
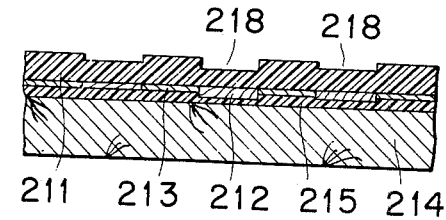
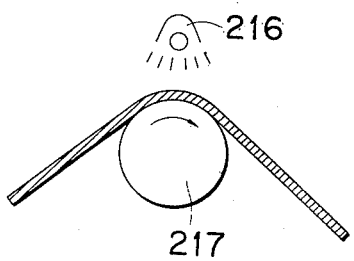

DECORATIVE LAMINATED STRUCTURES AND METHOD OF MAKING SAME

This invention relates to a laminated structure and a method of making the same.

More particularly, this invention is concerned with a decorative laminated structure having on its surface a pattern or design which structure has concaves and convexes caused by local heat shrinkages of a layer of a heat-shrinkable resin sheet employed therein to form the pattern or design, and a method of making the same.

There have heretofore been proposed various kinds of decorative laminated structures for uses not only as a material of a ceiling, floor, wall, etc. of a building, car, ship and the like but also as a material of furnitures, fittings, tables, musical instruments, cabinets and the like. Recently, however, many consumers are not satisfied with conventional decorative laminated structures having only a flat and smooth, decorated surface. There has been an increasing demand for novel, aethetic laminated structure which has on its surface a sophisticated and complicated pattern or design with a three dimensional effect. As the laminated structures provided on its surface with a pattern of a three dimensional effect, there have been known those having a surface with a pattern composed of various shapes of concaves and convexes.

As examples of the laminated structures having such pattern composed of concaves and convexes, there have been structures comprising a suitable base provided thereon with a pattern imitating a natural pattern of grains of wood or stone, a pattern of cloth or the like, and concaves formed thereon. Such concaves are usually formed on duct groove portions when the pattern of grains of wood is employed, on crack portions when the pattern of grains of stone is employed, or on woven portions when the pattern of cloth is employed. Thus, there have been provided decorative laminated structures with pattern full of reality as well as three dimensional imagination. In forming the concaves and convexes on the surface of the above-mentioned decorative laminated structure, such method is generally employed that a metallic mould roll or metallic mould plate having on its surface a pattern composed concaves and convexes is pressed onto the surface of the pattern of grains of wood or stone, a pattern of cloth or the like which is formed on the base thereby to effect an embossing processing.

For practising such method, it is necessary to provide the above-mentioned kind of metallic mould roll or metallic mould plate which is expensive to manufacture due to necessity of high degree of processing technique, leading to a high cost of the resulting product. Moreover, it is very difficult to make fine and complicated shapes of concaves and convexes on the metallic mould roll or plate and hence, the pattern of such metallic mould roll or plate tends inevitably to be of comparatively simple concave and convex shape. Consequently, with such conventional method, it is extremely difficult to make, on the pattern surface of the laminated structure, such a pattern of fine and complicated or sophisticated shapes of concaves and convexes as is capable of imparting to the product reality and three dimensional imagination.

Furthermore, it is noted that for practising the method employing a metallic mould roll or plate, the following additional difficulties or disadvantages are encountered:

1. When a varied pattern of concaves and convexes is desired, it is necessary to prepare an additional metallic mould roll or plate having a pattern corresponding to the varied pattern, leading to remarkably high cost.
2. With employing the metallic mould roll or plate having a pattern of concaves and convexes, it is very difficult to effect an embossing processing while coordinating the pattern of concaves and convexes of the metallic mould roll or plate with the pattern previously formed on the surface of the laminated structure. Even slight dis-coordination or disorder causes the commercial value of the product to be largely reduced.
3. Since the embossing processing is conducted mechanically and physically by employing the mould roll or plate made of metal, the surface of the desired decorative laminated structure will frequently be damaged during the processing operation.

In order to overcome the above-mentioned difficulties and disadvantages of the prior art and to obtain a decorative laminated structure having on its surface an excellent pattern or design composed of concaves and convexes, the present inventors have made intensive and extensive studies. As a result, it has been found that when a composite material comprising, in layer, a base, a heat-shrinkable resin sheet and a picture layer containing a plurality of heat sensitive picture areas contiguous and closely adherent to said heat-shrinkable resin sheet is irradiated with a heat ray, the composite material absorbs the heat ray and then the heat sensitive picture areas in the picture layer of the composite material is caused selectively to make elevation of temperature, thereby causing said heat-shrinkable resin sheet at its portions contiguous and closely adherent to said heat sensitive picture areas to shrink locally and to form concaves, whereby a decorative laminated structure having a beautiful pattern composed of concaves and convexes and being full of reality and three dimensional imagination. The present invention has been made, based on such novel finding.

Accordingly, it is an object of the present invention to provide a decorative laminated structure having a beautiful pattern of concaves and convexes.

It is another object of the present invention to provide a decorative laminated structure of the kind described, in which the concaves and such a pattern or design preliminarily or previously formed on the surface of the structure as of grains of wood or stone, or the like are co-ordinated.

It is still another object of the present invention to provide a decorative laminated structure of the above character, which is excellent in strength and durability and can be mass-produced.

It is a further object of the present invention to provide a method of making a decorative laminated structure of the kind described, which can be effected without utilizing a mechanical embossing processing by employing a metallic mould roll or plate.

It is a still further object of the present invention to provide a method of the character described which is simple in operation and can be carried out at low cost.

The foregoing and other objects, features and advantages of the present invention will be apparent to those skilled in the art from the following detailed description and the appended claims taken in connection with the accompanying drawings in which:

FIG. 15 shows a cross-sectional view showing a method of making a decorative laminated structure according to this invention by employing the composite material shown in FIG. 11 and the resulting surface shape of the structure;

Figure 9:
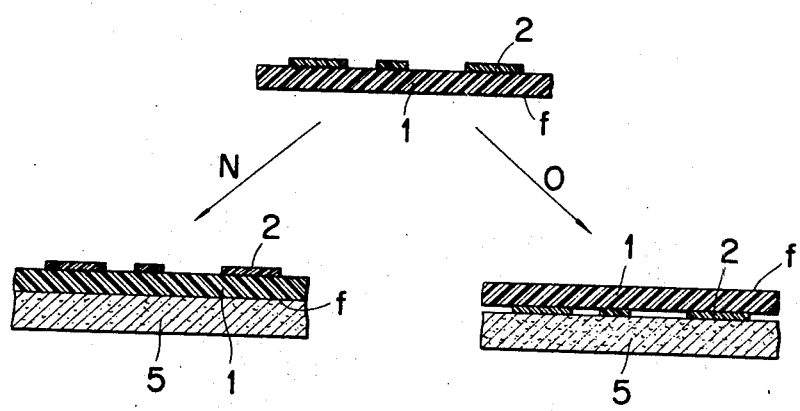
FIG. 9 shows cross-sectional views showing a still further mode of process for manufacturing a composite material to be employed for making a decorative laminated structure according to the present invention.
Figure 12:
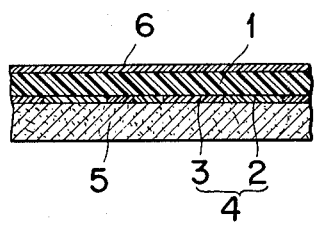
FIG. 12 shows cross-sectional views showing a still further mode of process for manufacturing a composite material to be employed for making a decorative laminated structure according to the present invention.
Figure 18:
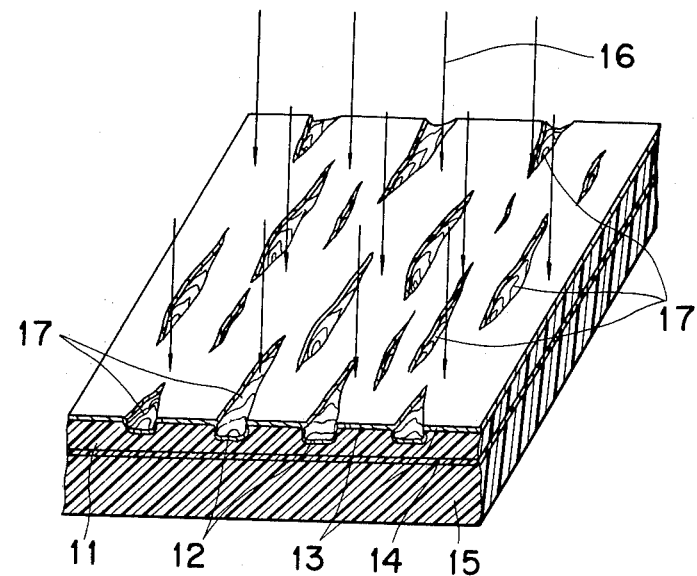
Figure 19:
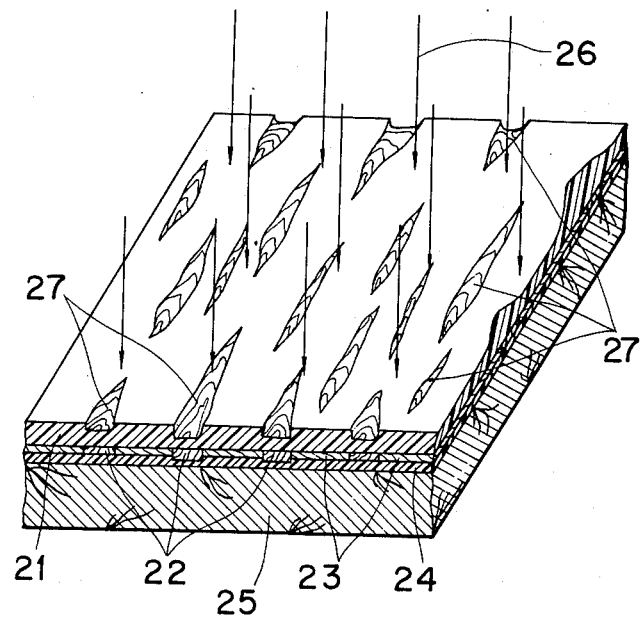
Figure 20:
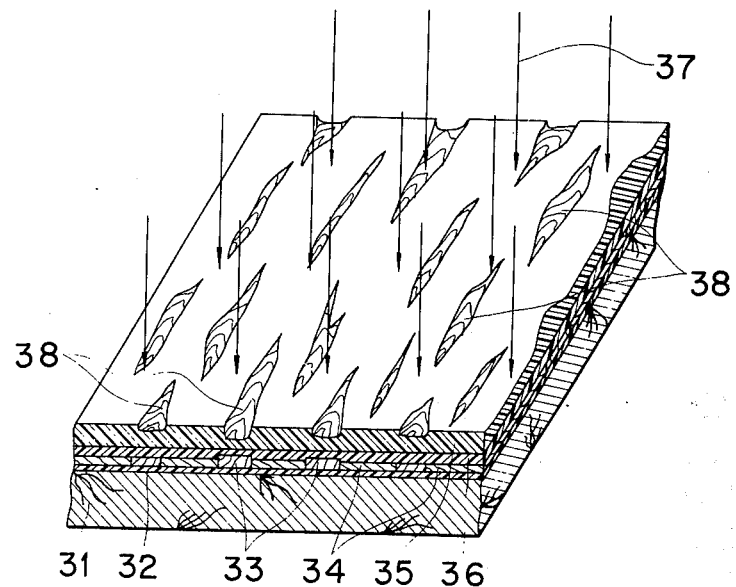
Figure 21:
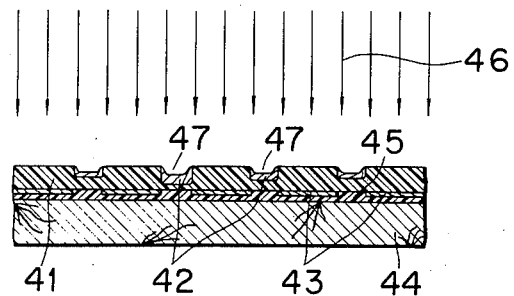
Figure 22:
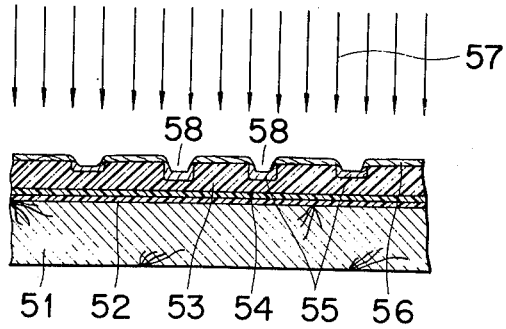
Figure 23:
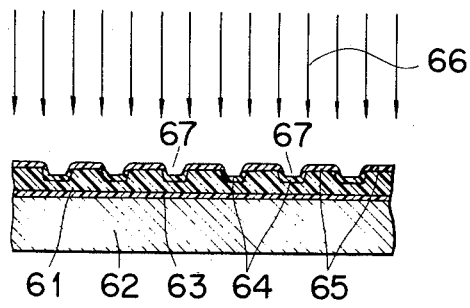
Figure 26:
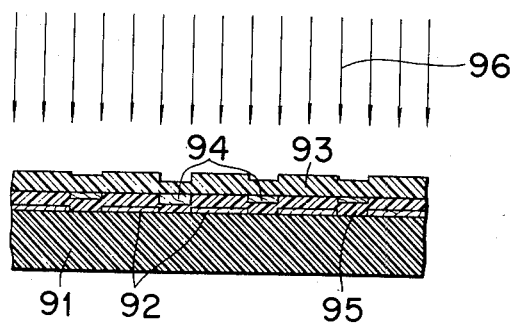
Figure 24:
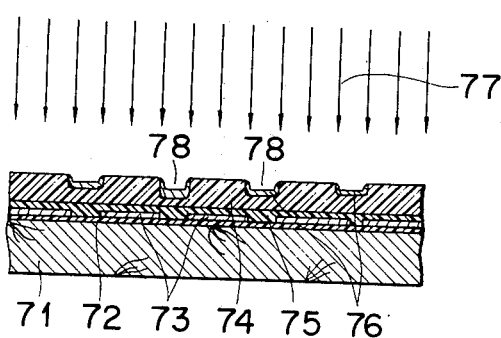
Figure 27:
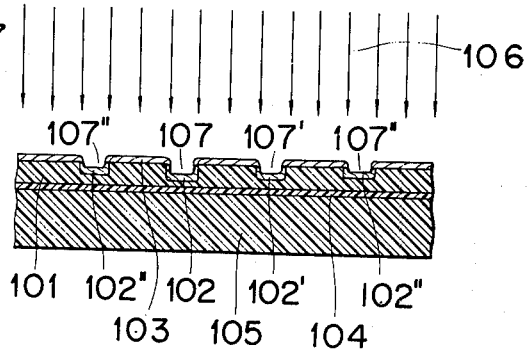
Figure 25:
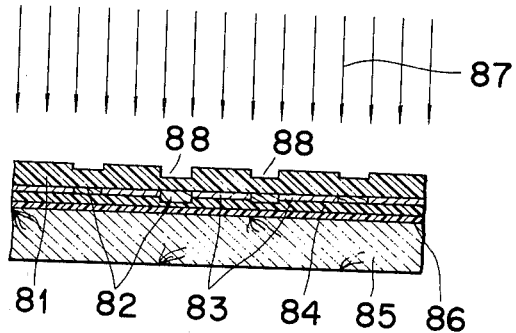
Figure 36:
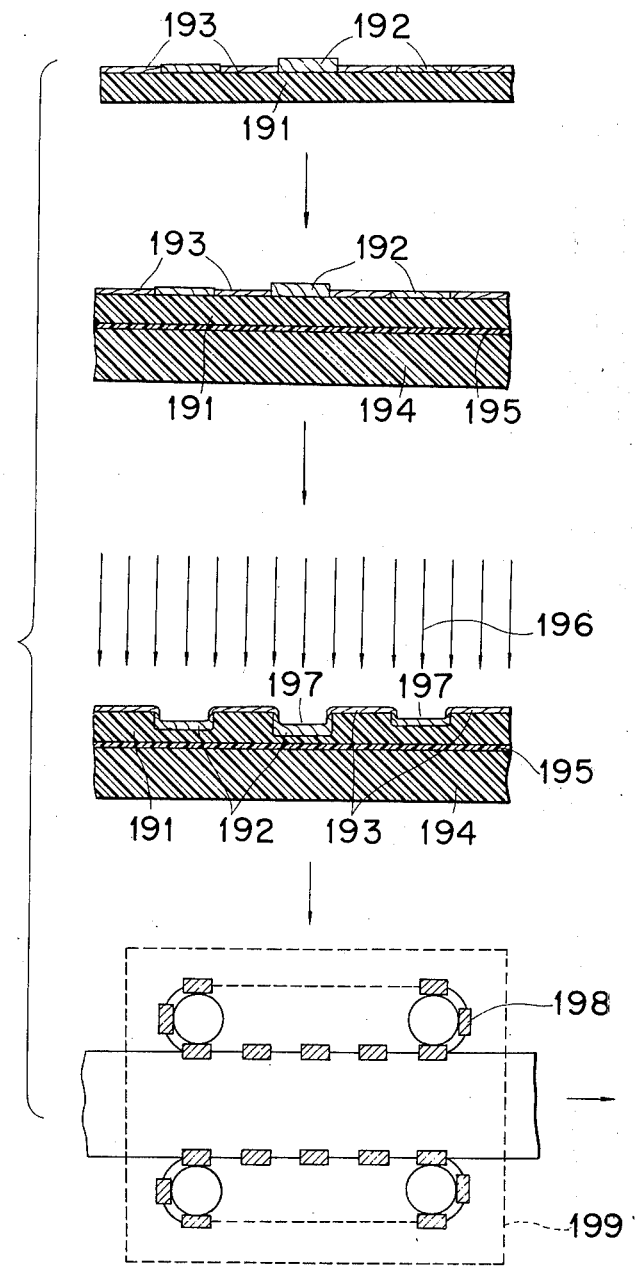
Figure 38:
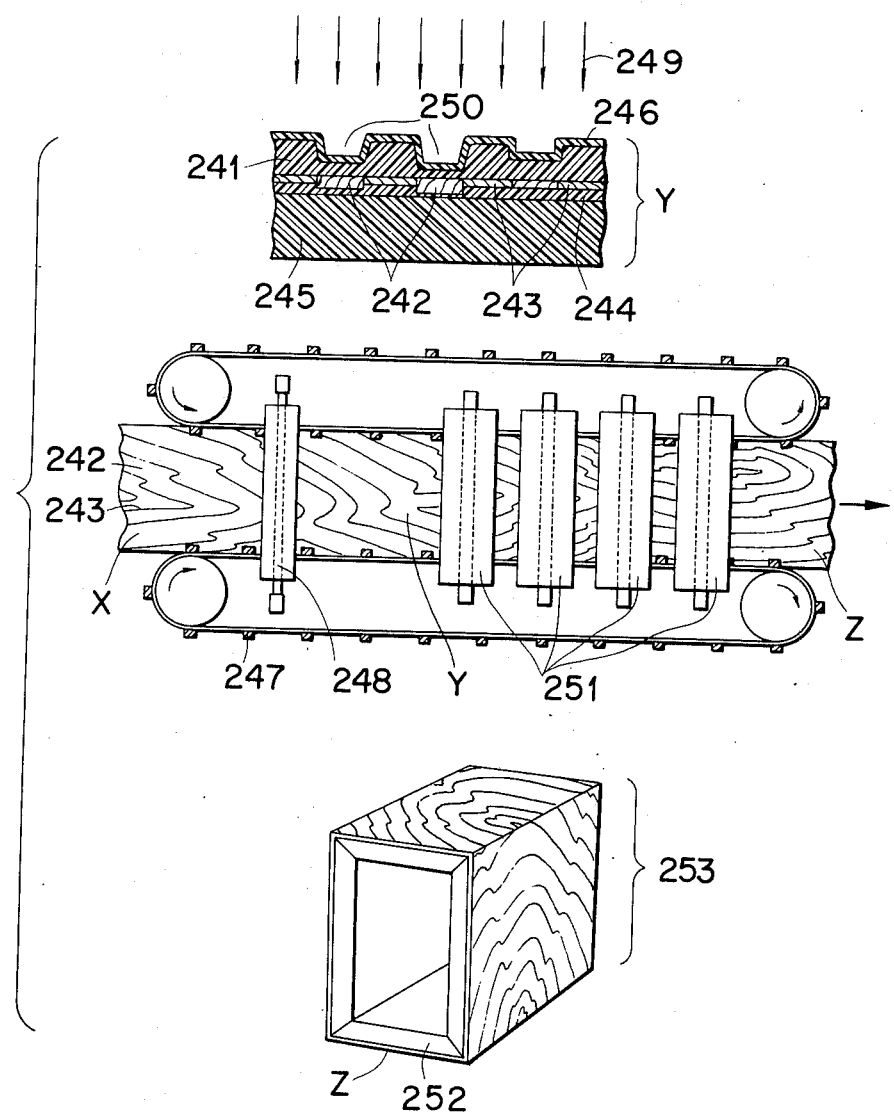

FIG. 16 shows a cross-sectional view showing a method of making a decorative laminated structure according to this invention by employing the composite material shown in FIG. 12 and the resulting surface shape of the structure FIG. 17 shows cross-sectional views showing a method of making a decorative laminated structure according to this invention by employing the composite material shown in FIG. 9 at the route N and the resulting surface shape of the structure;

FIG. 18 is a perspective view of one form of a decorative laminated structure embodying the present invention, with sides shown in cross section;

FIG. 19 is a perspective view of another form of a decorative laminated structure embodying the present invention, with sides shown in cross section;

FIG. 20 is a perspective view of still another form of a decorative laminated structure embodying the present invention, with sides shown in cross section;

FIG. 21 shows a cross-sectional view showing one mode of method of making a decorative laminated structure according to the present invention and the resulting surface shape of the structure;

FIG. 22 shows a cross-sectional view showing another mode of method of making a decorative laminated structure according to the present invention and the resulting surface shape of the structure;

FIG. 23 shows a cross-sectional view showing still another mode of method of making a decorative laminated structure according to the present invention and the resulting surface shape of the structure;

FIG. 24 shows a cross-sectional view showing a further mode of method of making a decorative laminated structure according to the present invention and the resulting surface shape of the structure;

FIG. 25 shows a cross-sectional view showing a still further mode of method of making a decorative laminated structure according to the present invention and the resulting surface shape of the structure;

FIG. 26 shows a cross-sectional view showing a still further mode of method of making a decorative laminated structure according to the present invention and the resulting surface shape of the structure;

FIG. 27 shows a cross-sectional view showing a still further mode of method of making a decorative laminated structure according to the present invention and the resulting surface shape of the structure;

FIG. 28 shows cross-sectional views showing a still further mode of method of making a decorative laminated structure according to the present invention and the resulting surface shape of the structure;

FIG. 29 shows cross-sectional views showing a still further mode of method of making a decorative laminated structure according to the present invention and the resulting surface shape of the structure;

FIG. 30 shows cross-sectional views showing a still further mode of method of making a decorative laminated structure according to the present invention and the resulting surface shape of the structure;

FIG. 31 shows a cross-sectional view showing a still further mode of method of making a decorative laminated structure according to the present invention and the resulting surface shape of the structure;

FIG. 32 shows a cross-sectional view showing a still further mode of method of making a decorative laminated structure according to the present invention and the resulting surface shape of the structure;

FIG. 33 shows a cross-sectional view showing a still further mode of method of making a decorative laminated structure according to the present invention and the resulting surface shape of the structure;

FIG. 34 shows a cross-sectional view showing a still further mode of method of making a decorative laminated structure according to the present invention and the resulting surface shape of the structure;

FIG. 35 shows a cross-sectional view showing a still further mode of method of making a decorative laminated structure according to the present invention and the resulting surface shape of the structure;

FIG. 36 shows cross-sectional views showing a still further mode of method of making a decorative laminated structure according to the present invention, and a diagrammatic plan view showing a process for heat-fixation of the heat-shrinkable resin sheet having still shrinkability;

FIG. 37 shows a cross-sectional view showing a still further mode of method of making a decorative laminated structure according to the present invention and a side view showing a process for irradiating the composite material with a heat ray to cause the heat-shrinkable resin sheet at its portions corresponding to the heat sensitive picture areas to cave in; and FIG. 38 shows a cross-sectional view showing a still further mode of method of making a decorative laminated structure according to the present invention, a plan view of an apparatus for irradiating the composite material with heat rays to shrink the heat-shrinkable resin sheet and to effect heat-fixation of the sheet and a perspective view of a cabinet made of a decorative laminated structure of the present invention.

Essentially, according to the present invention, there is provided a decorative laminated structure having a pattern of concaves and convexes which comprises a composite material including, in layer, a base, a heat-shrinkable resin sheet and a picture layer containing at least a plurality of heat sensitive picture areas contiguous and closely adherent to said heat-shrinkable resin sheet; and concaves formed on said heat-shrinkable resin sheet at its portions corresponding to said heat sensitive picture areas. Such decorative laminated structure can be obtained by laying a base, a heat-shrinkable resin sheet and a picture layer containing at least a plurality of heat sensitive picture areas in predetermined order to form a composite material, said heat sensitive picture areas being contiguous and closely adherent to said heat-shrinkable resin sheet; and irradiating the resulting composite material with a heat ray to cause said heat-shrinkable resin sheet at its portions corresponding to said heat sensitive picture areas to cave in, thus forming concaves.

Referring now to FIGS. 1 to 12, there are shown various modes of processes for manufacturing a composite material to be employed for making a decorative laminated structure according to the present invention. Essentially, as described before, the composite material comprises, in layer, a base, a heat-shrinkable resin sheet and a picture layer containing at least a plurality of heat sensitive picture areas contiguous and closely adherent to said heat-shrinkable resin sheet. Yet, in embodying the present invention there may be employed various forms of composite materials, which will be apparent from the following explanation.

Figure 1:
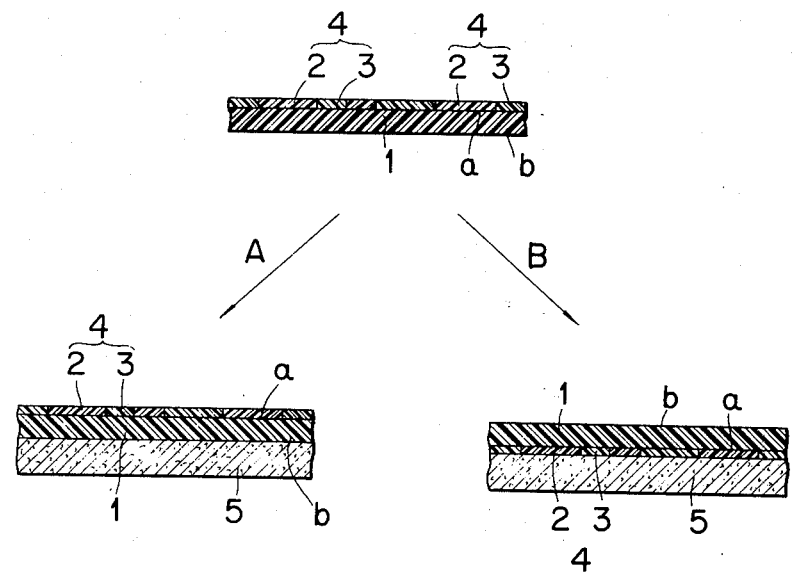
FIG. 1 shows cross-sectional views showing one mode of process for manufacturing a composite material to be employed for making a decorative laminated structure according to the present invention.

In FIG. 1, on a surface $a$ of a heat-shrinkable resin sheet 1 is formed a picture layer 4 consisting of heat sensitive picture areas 2 and heat insensitive picture areas 3 coordinating with heat sensitive pictures of the heat sensitive picture areas 2. Subsequently, according to the route as shown by an arrow A, a base 5 may be laminated on the back $b$ of the heat-shrinkable resin sheet to form a composite material. Alternatively, according to the route as shown by an arrow B, a base 5 may be laminated on the surface of the picture layer 4 on the heat-shrinkable resin sheet 1.

Figure 2:
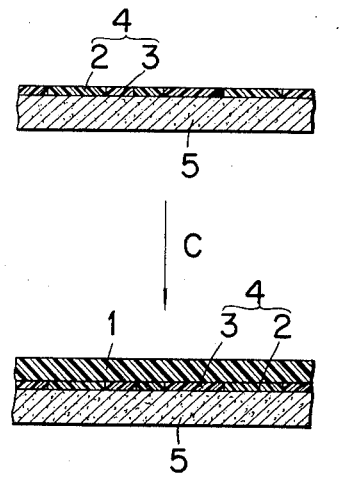
FIG. 2 shows cross-sectional views showing another mode of process for manufacturing a composite material to be employed for making a decorative laminated structure according to the present invention.

In FIG. 2, on a base 5 is formed a picture layer 4 consisting of heat sensitive picture areas 2 and heat insensitive picture areas 3 coordinating with heat sensitive pictures of the heat sensitive picture areas 2. Subsequently, according to the route as shown by an arrow C, a heat-shrinkable resin sheet 1 is laminated on the surface of the picture layer 4 on the base 5.

Figure 3:
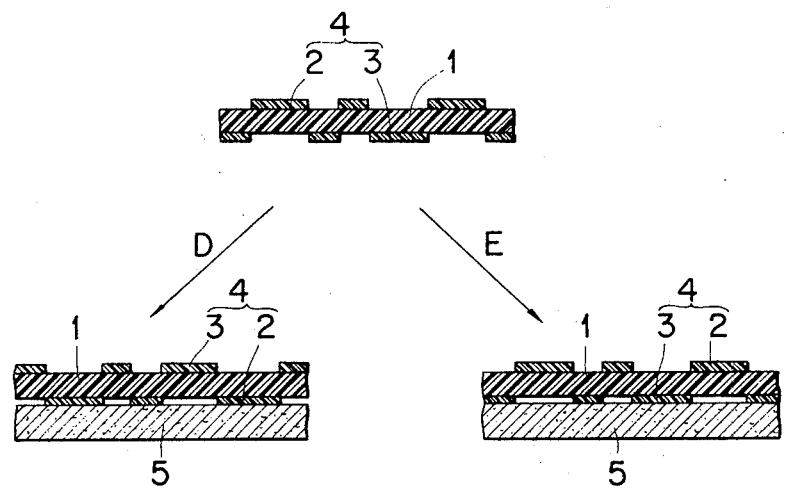
FIG. 3 shows cross-sectional views showing still another mode of process for manufacturing a composite material to be employed for making a decorative laminated structure according to the present invention.

In FIG. 3, on one face of a heat-shrinkable resin sheet 1 are formed heat sensitive picture areas 2, and on the other face of the heat-shrinkable resin sheet 1 are formed heat insensitive picture areas 3 coordinating with heat sensitive pictures of the heat sensitive picture areas 2. Subsequently, according to the route as shown by an arrow D, a base 5 may be laminated on the surfaces of the heat sensitive picture areas 2 on the heat-shrinkable resin sheet 1. Alternatively, according to the route as shown by an arrow E, a base 5 may be laminated on the surfaces of the heat insensitive picture areas 3 on the heat-shrinkable areas 1.

Figure 4:
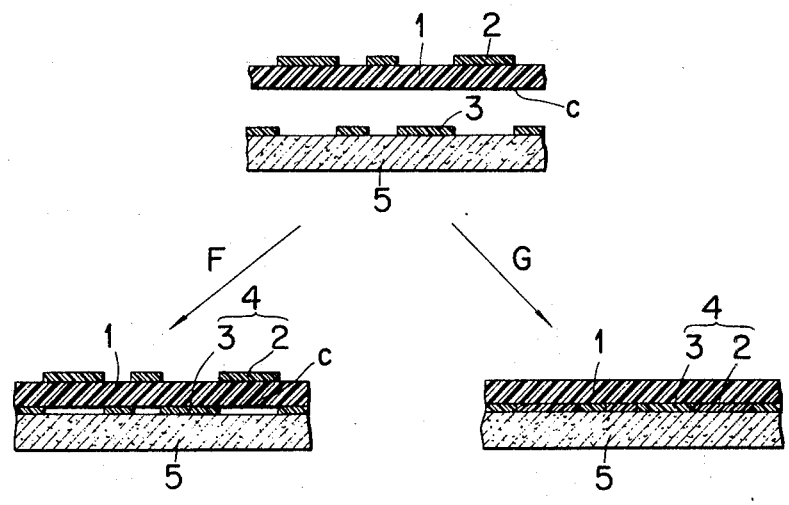
FIG. 4 shows cross-sectional views showing a further mode of process for manufacturing a composite material to be employed for making a decorative laminated structure according to the present invention.

In FIG. 4, heat sensitive picture areas 2 are formed on a heat-shrinkable resin sheet 1, while heat insensitive picture areas 3 coordinating with the heat sensitive pictures of the heat sensitive picture areas 2 are formed on a base 5. Subsequently, according to the route as shown by an arrow F, the face $c$ of the heat-shrinkable resin sheet on which there are no heat sensitive picture areas 2 may be laid on the faces of the heat insensitive picture areas 3 on the base 5 to form a composite material. Alternatively, according to the route as shown by an arrow G, laminating may be effected in such a manner that the heat sensitive picture areas 2 on the heat-shrinkable resin sheet 1 cooperate with the heat insensitive picture areas 3 on the base 5 to form a picture layer 4, as depicted.

Figure 5:
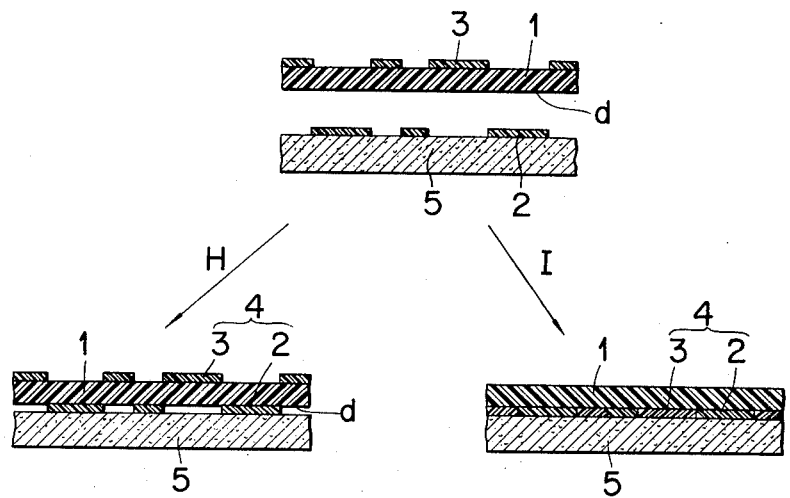
FIG. 5 shows cross-sectional views showing a still further mode of process for manufacturing a composite material to be employed for making a decorative laminated structure according to the present invention.

In FIG. 5, heat sensitive picture areas 2 are formed on a base 5, while heat insensitive picture areas 3 coordinating with the heat sensitive pictures of the heat sensitive picture areas 2 are formed on a heat-shrinkable resin sheet 1. Subsequently, according to the route as shown by an arrow H, the face $d$ of the heat-shrinkable resin sheet 1 on which there are no heat insensitive picture areas 3 may be laid on the faces of the heat sensitive picture areas 2 on the base 5 to form a composite material. Alternatively, according to the route as shown by an arrow I, laminating may be effected in such a manner that the heat insensitive picture areas 3 on the heat-shrinkable resin sheet 1 cooperate with the heat sensitive picture areas 2 on the base 5 to form a picture layer 4, as depicted.

Figure 6:
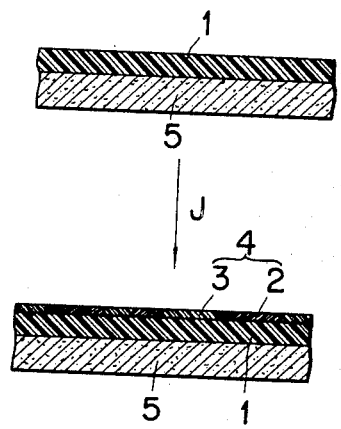
FIG. 6 shows cross-sectional views showing a still further mode of process for manufacturing a composite material to be employed for making a decorative laminated structure according to the present invention.

In FIG. 6, a heat-shrinkable resin sheet 1 is laminated on a base 5. Subsequently, according to the route as shown by an arrow J, on the thus laminated heat-shrinkable resin sheet 1 is formed a picture layer 4 consisting of heat sensitive picture areas 2 and heat insensitive picture areas 3 coordinating with the heat sensitive pictures of said heat sensitive picture areas 2, thereby to form a composite material.

Figure 7:
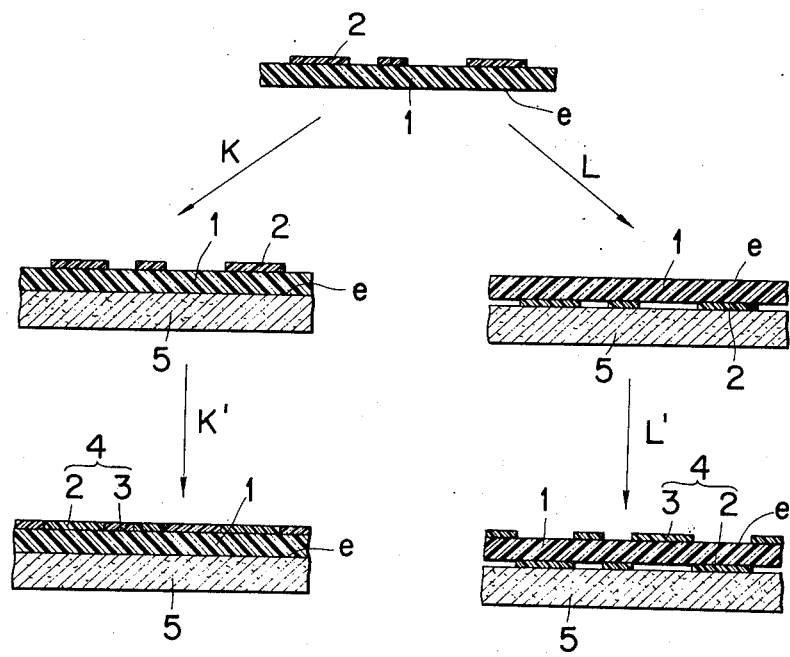
FIG. 7 shows cross-sectional views showing a still further mode of process for manufacturing a composite material to be employed for making a decorative laminated structure according to the present invention.

In FIG. 7, heat sensitive picture areas 2 are formed on a heat-shrinkable resin sheet 1. Subsequently, according to the route as shown by arrows K and K', the heat-shrinkable resin sheet 1 with its lower face $e$ on which the heat sensitive picture areas 2 are not formed is laminated on a base 5, whereupon heat insensitive picture areas 3 coordinating with the heat sensitive pictures of the heat sensitive picture areas 2 are formed on the upper face of the heat-shrinkable resin sheet 1 so as to form a picture layer 4, as depicted. Alternatively, according to the route as shown by arrows L and L', the heat-shrinkable resin sheet 1 with its upper face e on which the heat sensitive picture areas are not formed is laminated on a base 5, whereupon heat insensitive picture areas 3 coordinating with the heat sensitive pictures of the heat sensitive picture areas 2 are formed on said upper face e, as depicted. Moreover, although not shown in FIG. 7, on the heat-shrinkable resin sheet 1 may be first formed the heat insensitive picture areas 3 in place of the heat sensitive picture areas 2. Subsequently, the heat-shrinkable resin sheet 1 may be laminated on a base 5, whereupon the heat sensitive picture areas 2 may be formed.

Figure 8:
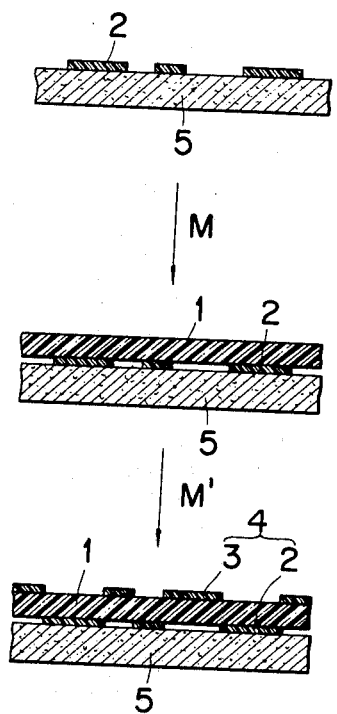
FIG. 8 shows cross-sectional views showing a still further mode of process for manufacturing a composite material to be employed for making a decorative laminated structure according to the present invention.

In FIG. 8, heat sensitive picture areas 2 are formed on a base 5. Subsequently, according to the route as shown by arrows M, M', a heat-shrinkable resin sheet 1 is laid on the base 5 with its upper face on which the heat sensitive picture areas 2 are formed, whereupon heat insensitive picture areas 3 are formed on the heat-shrinkable resin sheet 1. Although the heat insensitive picture areas 3 should, as repeatedly described hereinbefore, be those coordinating the heat sensitive pictures of the heat sensitive picture areas 2, the recitation to that effect will be hereinafter omitted for avoiding repetition. In the similar manner as explained in connection with FIG. 7, though not shown in FIG. 8, on the base 5 may be first formed the heat insensitive picture areas 3 in place of the heat sensitive picture areas 2. Subsequently, the base 5 may be laminated on a heat-shrinkable resin sheet, whereupon the heat sensitive picture areas 2 may be formed.

Figure 10:
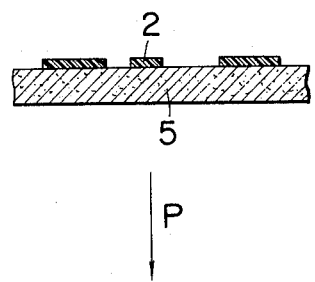
FIG. 10 shows cross-sectional views showing a still further mode of process for manufacturing a composite material to be employed for making a decorative laminated structure according to the present invention.

In any of the modes as mentioned above, the picture layer 4 consists of heat sensitive picture areas 2 and heat insensitive picture areas 3. However, according to the present invention, the picture layer 4 may consist of only heat snesitive picture areas 2. For example, as shown in FIG. 9, heat sensitive picture areas 2 are formed on a heat-shrinkable resin sheet 1. Subsequently, according to the route as shown by an arrow N, the heat-shrinkable resin sheet 1 with its lower face f on which the heat sensitive picture areas 2 are not formed may be laid on a base 5 to form a composite material. Alternatively, according to the route as shown by an arrow O, the heat-shrinkable resin sheet 1 with its upper face f on which the heat sensitive picture areas 2 are not formed may be laid on a base 5 to form a composite material. In addition, as shown in FIG. 10, heat sensitive picture areas 2 are formed on a base 5. Subsequently, according to the route as shown by an arrow P, a heat-shrinkable resin sheet 1 may be laid on the base 5 with its upper face on which the heat sensitive picture areas 2 are formed.

Figure 11:
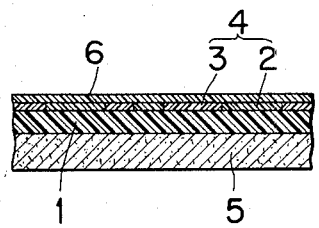
FIG. 11 shows cross-sectional views showing a still further mode of process for manufacturing a composite material to be employed for making a decorative laminated structure according to the present invention.

Furthermore, according to the present invention, the heat-shrinkable resin sheet of the composite material may be formed on its face with a coat layer for regulating gloss or luster of the surface of the composite material or protecting the surface of the same. For example, the manner of applying such coat layer to the composite material will be explained hereinbelow, taking the composite material shown in FIG. 1. As shown in FIG. 11, a coat layer 6 may be formed on the heat-shrinkable resin sheet 1 through the picture layer 4. Alternatively, as shown in FIG. 12, a coat layer 6 may be formed directly on the heat-shrinkable resin sheet 1.

The above-mentioned modes are given only for illustration of process for manufacturing a composite material. The composite material which can be employed for making a decorative laminated structure of this invention are not limited to those obtained by the above modes of processes.

The heat-shrinkable resin sheet to be employed for making a composite material may be any of those thermoplastic resin sheets having a heat-shrinkable property. Examples of such heat-shrinkable resin sheets embrace sheets of thermoplastic homopolymer resins or copolymer resins such as polyvinyl chloride type resins, polyvinylidene chloride type resins, polyolefin type resins including, for example polyethylene and polypropylene, polystyrene type resins, polyester type resins, polyamide type resins, polycarbonate type resins, polyvinyl alcohol type resins; cellulose type resins; rubber type resins; and the like. Of the above-mentioned sheets, there are preferably employed those sheets which are subjected to a processing of uniaxial or biaxial stretching at the optimum temperature for stretching and then not subjected to any treatment for thermal fixation or subjected to insufficient treatment for thermal fixation to have a remaining heat-shrinkable property. The term "sheet" used herein is intended to include a film, a thin sheet and a sheet.

Moreover, as a heat-shrinkable resin sheet, there may be employed any of thermoplastic sheets which are transparent or opaque, uncolored, which are transparent or opaque, colored, which contain fillers and the like, or which have such a coarse surface as is provided with grains of sand and the like to deluster the surface, as far as it has a heat-shrinkable property.

The various conditions of the heat-shrinkable resin sheet, such as rate of heat-shrinkage, direction of stretching heat-shrinkage-initiating temperature, shrinking force, thickness and the like have influences on the depth and size of the concaves formed on the heat-shrinkable resin sheet, but they are not critical for the present invention. As described before, as far as the resin sheet has a heat-shrinkable property, it can be used in the method of this invention. Illustratively stated, when the rate of shrinkage of the heat-shrinkable resin sheet is low, the concaves formed on such resin sheet becomes shallower and smaller. Yet, the depth and size of the concaves on the heat-shrinkable resin sheet can be appropriately regulated by increasing intensity of the heat ray. Moreover, when there is employed a heat-shrinkable resin sheet having a high shrinkage-initiating temperature, the concaves formed on such resin sheet become shallower and smaller. Yet, the depth and size of the concaves on the heat-shrinkable resin sheet can be appropriately regulated by increasing intensity of the heat ray.

The materials of a base may be any of known materials capable of laminating together with the heat-shrinkable resin sheet. Examples of these materials to be used for making the base embrace various kinds of papers; cellophane; such resin sheets as of acetate type resins, polyolefin type resins such as polyethylene and polypropylene, polyvinyl chloride type resins, polyvinylidene chloride type resins, polystyrene type resins, polycarbonate type resins, polyvinyl alcohol type resins, polyamide type resins, polyester type resins and the like; various metallic plates and foils, various wooden sheets and plywoods; rubber sheets; and lamination films made by laminating any of them in accordance with an ordinary method. The base materials which are transparent or opaque, uncolored, or which are transparent or opaque, colored, may be employed.

The term "heat sensitive picture area" is used herein to mean a picture area formed with a heat sensitive ink composition containing a heat absorbing material having a relatively good absorbability of a heat ray when the heat absorbing material is irradiated with the heat ray. The term "heat insensitive picture area" is used herein to mean a picture area formed with a heat insensitive ink composition containing a heat poor-absorbing material having a relatively poor absorbability of a heat ray, as compared with said heat absorbing material, when the heat absorbing material is irradiated with the heat ray. In this connection, it is to be noted that whether the material is "heat sensitive" or "heat insensitive" is determined depending upon difference in respect of heat sensitivity between the material and the other. Differently stated, it is a matter of relativity.

The picture layer containing at least a plurality of heat sensitive picture areas may comprise only the heat sensitive picture areas or may comprise the heat sensitive picture areas and the heat insensitive picture areas. Illustratively stated, for example, in case of the decorative laminated structure having the pattern of grains of wood, the pattern of grains of stone or the pattern of cloth, the structure comprises the heat sensitive picture areas forming concaved pictures at duct groove portions for the pattern of grains of wood, at crack portions for the pattern of grains of stone, or at woven portions for the pattern of cloth; and the heat insensitive picture areas forming the other pictures, thus, as a whole, forming the pattern of grains of wood, the pattern of grains of stone or the pattern of cloth.

In making the picture layer containing at least the heat sensitive picture areas, according to the present invention, only the heat sensitive picture areas or both of the heat sensitive picture areas and the heat insensitive picture areas coordinating with the heat sensitive pictures of the heat sensitive picture areas are formed on the heat-shrinkable resin sheet and/or the base prior or posterior to laminating the heat-shrinkable resin sheet and the base with each other.

As a method for forming the heat sensitive picture areas or both of the heat sensitive picture areas and the heat insensitive picture areas on the heat-shrinkable resin sheet and/or the base, there may be employed an ordinary printing such a photogravure printing, an offset printing, a relief printing, a screen printing, an electrostatic printing or a transfer printing; a hand-picturing or painting by a pen or brush; or a method of pasting pictures. In the above method, as described hereinbefore, it is necessary to employ a heat sensitive ink composition containing a heat absorbing material or both of the above-mentioned heat sensitive ink composition and a heat insensitive ink composition containing a heat poor-absorbing material having a relatively poor absorbability of a heat ray as compared with said heat absorbing material. Thus, there can be formed a desired pattern such a letter, figure, symbol and/or picture.

In the above printing, there may be employed a monocolor printing, multicolor printing or fold-printing. Differently stated, any printing may be employed so far as the heat sensitive picture areas or the heat sensitive picture areas and the heat insensitive picture areas coordinate with each other to form a pattern of grains of wood, a pattern of grains of stone, a pattern of cloth or the like.

In forming the heat sensitive picture areas or both of the heat sensitive picture areas and the heat insensitive picture areas on the heat-shrinkable resin sheet and/or the base, the suitable preliminary treatment may be applied to the surface of the heat-shrinkable resin sheet and/or the base, if desired. For example, there may be applied to the surface a washing, a grinding, a precoating and/or the like.

Each of the heat sensitive ink composition containing the heat absorbing material and the heat insensitive ink composition containing the heat poor-absorbing material having a relatively poor absorbability of a heat ray as compared with said heat absorbing material is generally an ink composition or a paint composition which comprises a vehicle; a coloring material such as dye or pigment; and additives such as plasticizer, a stabilizer, a wax-greese, a dryer, an auxiliary dryer, a hardening agent, a thickening agent, a dispersing agent, a filler and/or the like; said vehicle, said coloring material and said additives being well blended using a solvent, a diluent and/or the like.

Examples of the vehicles to be employed for the ink or paint composition included fats and oils such as linseed oil, soybean oil, synthetic drying oils and the like; natural and processed resins such as rosin, copal, dammar, hardened rosin, rosin esters, polymerized rosin and the like; synthetic resins such as a rosin modified resin, a 100% phenolic resin, a maleic acid resin, an alkyd resin, a petroleum type resin, a vinyl type resin, an acrylic type resin, a polyamide type resin, an epoxy type resin, aminoalkyd resin and the like; cellulose derivatives such as nitrocellulose, ethylcellulose and the like; rubber derivatives such as rubber chloride, cyclized rubber and the like; glue; casein; dextrin; zein; and the like.

The term "heat sensitive ink composition" is used herein to means an ink or paint composition which is capable of forming a coat film having a high rate of absorption of a heat ray and adapted to be different in rate of heat ray absorption due to hue, concentration, etc. The term "heat insensitive ink composition" is used herein to mean an ink or paint composition forming a coat film having a low rate of absorption of a heat ray. In short, whether the ink composition is "heat sensitive" or "heat insensitive" is determined depending on the relative difference in its rate of heat ray absorption.

Similarly, the heat absorbing material means a material, for example a coloring material such as a dye or pigment, which has a high rate of heat ray absorption and is adapted to be different in rate of heat ray absorption due to hue, concentration, etc. Whilst, the heat poor-absorbing material means a material, for example a coloring material such as a dye or pigment, which has a low rate of heat ray absorption. In short, whether the material is "heat absorbing" or "heat poor-absorbing" is determined depending on the relative difference in its rate of heat ray absorption. Illustratively stated, the rate of heat ray absorption of a black type coloring material is generally about 90%; that of a green, light brown, gray or blue type coloring material about 65–75%; that of a red type coloring material about 65%; that of a light green type coloring material about 55%; that of a creamy type coloring material about 45%; and that of a white type coloring material about 35–40%. The above values are well known, and obtained on the basis that the rate of heat ray absorption of an ideal black body is 100%.

For forming a heat-shrinkable resin sheet – base laminate of the composite material to be employed in the present invention, there may be employed any of various conventional methods, for example an adhesive lamination method wherein an adhesive is coated on the heat-shrinkable resin sheet and/or the base and then the sheet and the base are adhered to each other, utilizing a pressing roll or the like; a heat lamination method; high frequency lamination method; and the like. The adhesive may be those well known in the art and include, for example adhesives containing as a main component an acrylic resin, a vinyl type resin, an polyamide type resin, a cellulose type resin, aminoplast resin, a phenolic resin, a polyester type resin, a furan type resin, an epoxy type resin, a polyurethane type resin, a rubber or the like. The above-mentioned adhesive may be any of types, for example, an emulsion type adhesive, a solvent sensitive adhesive, a reaction sensitive adhesive or the like.

In making the heat-shrinkable resin sheet-base laminate, there may be applied, to the surface of the heat-shrinkable resin sheet and/or the surface of the base, a suitable known pre-treatment such as treatment for rendering the surface flat and smooth by grinding, precoating and/or the like.

In applying a coat or overcoat layer onto the composite material to be employed in the method of this invention, there may be employed an ordinary coating method such as roll coating, gravure coating, bar coating, flow coating, dip coating, spray coating, using a resin composition obtained by well blending a resin, a filler, a solvent and the like; or may be employed a lamination method wherein a film or sheet of resin it laminated on the composite material by an ordinary method such as an adhesive lamination method, heat-fusion lamination method or the like. The resins to be employed in the above include, for example, natural or processed resins; synthetic resins such as an alkyl resin, a butylated aminoaldehyde resin, a phenolic resin, a vinyl type resin, an acrylic resin, an epoxy type resin, an urethane type resin, a butyral resin and the like; cellulose derivatives such as a nitrocellulose, acetylcellulose, autylbutylcellulose and the like; a rubber derivative; and the like. The films or sheets of resin to be employed in the above include, for example, those of a resin such as polyethylene, polypropylene, a polyester, polyvinylidene chloride, polystyrene, polycarbonate, polyvinyl alcohol, a polyamide or the like. As the fillers as mentioned above, there may be employed titanium oxide, alumina white, gypsum, silica, calcium carbonate, barium sulfate, clay and the like.

As described, a composite material is easily obtained which comprises, in layer, a base, a heat-shrinkable resin sheet and a picture layer containing at least heat sensitive picture areas contiguous and closely adherent to said heat-shrinkable resin sheet.

According to the method of the present invention, the thus obtained composite material is irradiated with a heat ray to cause the heat-shrinkable resin sheet at its portions corresponding to said heat sensitive picture areas to cave in, thus forming a pattern of concaves and convexes. Thus, there can be obtained a decorative laminated structure having on its surface a pattern of concaves and convexes.

Figure 13:
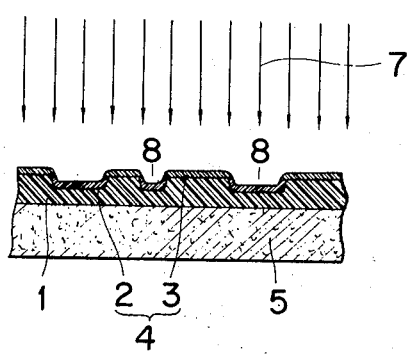
FIG. 13 shows a cross-sectional view showing a method of making a decorative laminated structure according to this invention by employing the composite material shown in FIG. 1 at the route A and the resulting surface shape of the structure.

Referring now to FIG. 13 in which there is shown a view illustrating a method of making a decorative laminated structure according to this invention by employing the composite material of FIG. 1 at the route A and the resulting surface shape of the structure. When the composite material is irradiated with a heat ray 7, a heat-shrinkable resin sheet 1 at its portions corresponding to heat sensitive picture areas 2 is selectively caused to cave in together with the heat sensitive pictures of said heat sensitive picture areas 2, thereby forming concaves 8. As a result of this, there can be obtained a decorative laminated structure having a surface with concaves 8 colored with a color of the heat sensitive picture areas 2.

Figure 14:
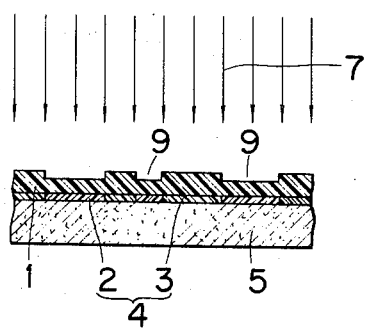
FIG. 14 shows a cross-sectional view showing a method of making a decorative laminated structure according to this invention by employing the composite material shown in FIG. 1 at the route B and the resulting surface shape of the structure.

Referring to FIG. 14 in which there is shown a view similar to that of FIG. 13, employing a composite material of FIG. 1 at the route B. When the composite material is irradiated with a heat ray 7, a heat-shrinkable resin sheet 1 at its portions corresponding to heat sensitive areas 2 is selectively caused to cave in, thereby forming concaves 9. As a result, a decorative laminated structure of this invention can be obtained. In FIG. 15 is shown a similar view to FIG. 13, employing a composite material of FIG. 11.

The irradiation of the composite material with a heat ray 7 causes a heat-shrinkable resin sheet 1 selectively at its portions corresponding to heat sensitive picture areas 2 to cave in together with the heat sensitive picture areas 2 and an overcoat layer 6, thereby forming a decorative laminated structure having on its surface concaves 10. As shown in FIG. 16, when a composite material of FIG. 12 is employed, the irradiation of the composite material with a heat ray 7 causes a heat-shrinkable resin sheet selectively at its protions corresponding to heat sensitive picture areas 2 to cave in together with an overcoat layer 6, thereby forming a decorative laminated structure having on its surface concaves 11.

As apparent from the above description, in case the heat sensitive picture areas are formed on the surface of the heat-shrinkable resin sheet of the composite material, the irradiation of the composite material with a heat ray causes the heat-shrinkable resin sheet at its portions corresponding to said heat sensitive picture areas to cave in together with the heat sensitive pictures of the heat sensitive picture areas, thereby forming concaves which are colored with a color of the heat sensitive picture areas. On the other hand, in case the heat sensitive picture areas are formed between the heat-shrinkable resin sheet and the base, the irradiation of the composite material with a heat ray causes only the heat-shrinkable resin sheet at its portions corresponding to the heat sensitive picture areas to cave in, thereby forming concaves. Furthermore, in case the overcoat layer is formed on the composite material, the overcoat layer is also caused to cave in together with the heat-shrinkable resin sheet, thereby forming concaves.

Also in respect of each of the composite materials of FIGS. 2 – 10, although not shown, the irradiation of the composite material with a heat ray causes concaves in the heat-shrinkable resin sheet in the substantially same manner as described above, thus producing a decorative laminated structure having on its surface a pattern of concaves and convexes according to the present invention.

As shown in FIG. 17, when the composite material of FIG. 9 at the route N is employed having a picture layer containing only heat sensitive picture areas, the composite material is irradiated with a heat ray to cause the heat-shrinkable resin sheet to cave in whereby concaves 12 are formed, and subsequently heat insensitive picture areas 3 coordinating with said concaves 12 are provided. Thereby, there can be obtained a decorative laminated structure having on its surface a pattern of concaves and convexes according to the present invention.

In FIGS. 15 and 16, the composite material with the overcoat layer thereon is irradiated with the heat ray to obtain a laminated structure with the overcoat layer thereon. Alternatively, as shown in FIGS. 13 and 16, the composite material without the overcoat layer is irradiated with the heat ray to form the laminated structure with the concaves on the surface, whereupon the laminated structure may be formed, on its surface, with an overcoat layer by the aforementioned method to obtain a laminated structure having its surface with the overcoat layer.

In carrying out the irradiation of the composite material with a heat ray, an infrared ray is most preferably employed as the heat ray. As a source of the infrared ray, there may be employed, for example a filament lamp, a discharge lamp, an arc lamp or a flash lamp. Heat can be transmitted to the composite material through heat transmission by radiation from such lamps.

For effecting a selective heating due to heat ray absorption by utilizing difference in rate of heat ray absorption between the heat sensitive picture areas and the heat insensitive picture areas, it is preferable to employ an infrared ray having a short wave length. The source capable of radiating a near infrared ray (wave length: about 0.8 - 2.5 $\mu$) having a peak of spectral distribution at a wave length of about 1.0 $\mu$ is preferably employed. In practice, there may be employed an ordinary tungsten filament lamp, a tungsten filament lamp containing a halogen gas, a xenon lamp or the like. Also, even the commercially easily available heating type copying machine can attain the object.

In irradiating the composite material with the heat ray, when the exposure dose is too much, the elevation in temperature of the heat sensitive picture areas becomes too high. As a result of this, the heat-shrinkable resin sheet is caused not only to cave in but also to be heat-fused, leading to cutting and/or boring with disadvantage.

The heat ray irradiation may be effected from any direction to the composite material. However, there may be a case where the irradiation is prevented by the base. Therefore, it is preferable to irradiate the composite material in the direction to the heat-shrinkable resin sheet.

The size and depth of the concave formed on the heat-shrinkable resin sheet by the heat ray irradiation is varied depending on various factors. Such factors include, for example, kind, rate of shrinkage, thickness, etc. of the heat-shrinkable resin sheet; hue, concentration, area, etc. of the heat sensitive picture areas; and exposure dose, exposure time, etc. in respect of the heat ray. For this reason, it is preferable to choose an appropriate condition according to the case. Yet, in this connection, it should be noted that, of the above-mentioned various factors, the hue, concentration, area, etc. of the heat sensitive picture areas have the greatest influence on the size and depth of the concave to be formed on the heat-shrinkable resin sheet.

As described, according to the present invention, when the composite material is irradiated with the heat ray, the heat sensitive picture areas in the picture layer containing at least the heat sensitive picture areas are heated to a high temperature, as compared with the heat insensitive picture areas, if any. As a result, there is caused a difference in rate of thermal shrinkage of the heat-shrinkable resin sheet, to wit, the portions corresponding to the heat sensitive picture areas are caused to make larger shrinkage, resulting in concaves.

The thus obtained decorative laminated structure contains the heat-shrinkable resin sheet having concaves formed locally at its portions corresponding to the heat sensitive picture areas. Yet, the heat-shrinkable resin sheet has, at its portions formed with no concave, a still remaining heat-shrinkability and hence; when such decorative laminated structure is heated to a temperature higher than the shrinkage-initiating point of the heat-shrinkable resin sheet, such resin sheet under-goes heat shrinkage, resulting in bending or folding of the laminated structure. In order to obviate such drawbacks, the laminated structure may be subjected to a treatment for heat fixation while fixing the peripheral edges of the structure, whereby the heat stability of the present decorative laminated structure is greatly improved to avoid the heat distortion. Illustratively stated, for attaining the heat fixation of the present decorative laminated structure, the structure is heated, while fixing the peripheral edges so as to prevent the dimensional change, at a temperature above the shrinkage-initiating point and the second order transition point and below the melting point, using a heated air, a liquid of high temperature, a far infrared ray, a heating roll or the like. It is preferable to employ a temperature higher than the stretching temperature, and the fixation effect is increased by heating the structure at a temperature as high as possible and allowable. The temperature and the heating time are varied depending on kind of the heat-shrinkable resin sheet employed. Moreover, it is to be noted that the present structure is a laminate one. For this reason, according to the case, the suitable temperature and time should be appropriately choosen, taking into consideration the kinds of materials and their thicknesses as well as the intended use of the present laminated structure. In order to fix the peripheral edges for preventing shrinkage of the heat-shrinkable resin sheet during the course of heat fixation treatment at high temperature, there may be employed an apparatus of the design substantially similar to that of an ordinary tender used for the woven article. Using such apparatus, the present decorative laminated structure is heated while supplying the structure which is held at its both ears or sides by means of a plurality of clips having a width of about 2 - 5 cm. Alternatively, the heat fixation of the structure may be effected employing a heating roll utilizing, as a heat source, electricity or steam. In such case, when the area of the laminated structure wound on the heating roll is increased, the dimensional change of the structure is automatically avoided due to frictional force acting between the roll and the structure, thereby enabling necessity of the clips to be eliminated.

By effecting the above-mentioned heat fixation treatment, the remaining heat-shrinkability of the heat-shrinkable resin sheet can be obviated and, at the same time, the shapes of the concaves formed, by a heat ray irradiation, on the heat-shrinkable resin sheet at its portions corresponding to the heat sensitive picture areas can be kept unchanged. Yet, it is desirable to avoid the use of too high a temperature. In practice, for example, when the heat-shrinkable polyester resin film having a thickness of 12 $\mu$ and a shrinkage rate of 40% at 100°C. is heated, while fixing the peripheral edges of the film, at a temperature of 240°C. for 20 seconds using heated wind, the film can be heat-fixed with a shrinkage rate of 1% at 100°C. Also, when the polyvinyl chloride resin film having a thickness of 40 μ and a heat shrinkage rate of 25% at 100°C is passed, while fixing the peripheral edges of the film, through a heating furnace with four 200 V ultra-far infrared heaters each having an irradiation intensity of 10 W/cm for 4 seconds, the film can be heat-fixed with a shrinkage rate of 3% at 100°C.

As described, according to the present invention, when the composite material which comprises, in layer, a heat-shrinkable resin sheet, a base and a picture layer containing at least a plurality of heat sensitive picture areas contiguous and closely adherent to said heat-shrinkable resin sheet is irradiated with a heat ray, the heat-shrinkable resin sheet is caused, at its portions corresponding to the heat sensitive picture areas, to cave in, thereby forming concaves varied in size and depth depending on temperature differences due to the varied rates of heat ray absorptions of the heat sensitive picture areas distributed in the picture layer. Thus, there can be obtained a decorative laminated structure having on its surface a pattern of concaves and convexes which is excellent in strength and durability and full of reality, beauty, decorative effect as well as three dimensional effect or imagination. Furthermore, the heat sensitive picture areas generally composed of the heat sensitive ink composition and hence; the resulting concaves are effectively colored.

Moreover, it is to be noted that the picture layer containing at least the heat sensitive picture areas can be readily made by printing or the like to render the pattern composed of the heat sensitive areas fine and delicate. As a result, the fine and delicate concaves can also be made on the heat-shrinkable resin sheet at its portions corresponding to the heat sensitive picture areas, thus affording to the resulting laminated structure with such concaves a reality, decorative effect, and three dimensional effect or imagination.

Furthermore, it is to be noted that, according to the present invention, the formation can be done, without employing a metallic mould roll or metallic mould plate as is usually employed in the prior art, only by incorporating a heat ray irradiating process in a printing process. As a result, the desired decorative laminated structures can be readily mass-produced at low cost.

The present decorative laminated structure has, alone or in combination with the other structures, a wide variety of uses, for example, not only as a material for a ceiling, a floor, a wall and/or an interior decoration of a building, car, ship and the like but also as a decorative material for furnitures, fittings, tables, musical instruments, cabinets and the like. For the above mention uses, the present structures can be employed with great advantage.

The following examples are given only for illustration of the present invention but should not be construed to limit the scope of this invention.

EXAMPLE 1

Referring to FIG. 18, the pictures 12 of the duct groove portions of the pattern of grains of wood were gravure-printed, using a dark black ink composition containing as a vehicle a vinyl chloride-vinyl acetate copolymer, on a heat-shrinkable polyvinyl chloride resin sheet (manufactured and sold by Mitsubishi Plastics Ind., Ltd., Japan. Trade name: HISHIREX-502. Shrinkage rate: 45–50% at 100°C. Thickness: 40 μ). On the other hand, the pattern 13 of grains of wood coordinating with the above-mentioned pictures 12 of the duct groove portions were gravure-printed, using a brown ink composition containing as a vehicle a vinyl chloride-vinyl acetate copolymer, on the heat-shrinkable polyvinyl chloride resin sheet 11. Then, on the back of the heat-shrinkable polyvinyl chloride resin sheet 11 was pasted, through the medium of a vinyl chloride-vinyl acetate copolymer type adhesive 14, a brown-colored heat resistant polyvinyl chloride resin sheet 15 (manufactured and sold by Riken Vinyl Ind. Co., Ltd., Japan. Trade name: Riken Film, Cabinet FC-4648. Thickness: 100 μ) to obtain a composite material.

The thus obtained composite material was irradiated, over the side of the printed heat-shrinkable polyvinyl chloride resin sheet, with a near infrared ray 16 (having a peak of spectral distribution at 1.03 μ) at an irradiation speed of 16 cm/sec. using a bar type infrared ray tungusten filament lamp (manufactured and sold by Ushio Electric Inc., Japan. 200 V, 3000 W). As a result, the pictures 12 of the duct groove portions were caused to cave in, thereby to form concaves 17 which were colored with a color of the pictures 12. Thus, there were obtained a desired three-dimensionally decorated, laminated structure.

The substantially same procedure as described above was repeated except that a line paper with its surface brown-colored (manufactured and sold by Kohjin Co. Ltd., Japan. Trade name: Kohjin WK-130. Thickness: 230 μ) for use as a wall paper was employed in place of the heat resistant polyvinyl chloride sheet 15. There was obtained a wall paper having a three-dimensionally decorated face.

Moreover, the substantially same procedure as described above was repeated except that the pattern 13 of grains of wood was firstly applied and then the pictures 12 of the duct groove portions was applied. There was obtained a three-dimensionally decorated, laminated structure having the similar effect to the above.

Furthermore, the substantially same procedure as described above was repeated except that there was employed, in place of the heat-shrinkable polyvinyl chloride film, a heat-shrinkable polyvinylidene chloride type film, polyester type film, polyamide type film, polystyrene film, polyethylene film or polypropylene film. There was obtained a three-dimensionally decorated, laminated structure having the similar effect to the above.

EXAMPLE 2

Referring to FIG. 19, the pictures 22 of the duct groove portions of the pattern of grains of wood were offset-printed, using a dark black ink composition containing as a vehicle an alkyd resin on a heat-shrinkable polyvinyl chloride resin sheet 21 (manufactured and sold by Nippon Carbide Ind. Co., Ltd., Japan. Trade name: Hi-S Film No. 111L3. Shrinkage rate: longitudinally 5%, laterally 50%. Thickness: 40 μ). On the other hand, the pattern 23 of grains of wood coordinating with the above-mentioned pictures 22 of the duct groove portions were offset-printed, using a brown ink composition containing as a vehicle an alkyd resin. Then, on the face printed with the pattern 23 and the pictures 22 of said heat-shrinkable polyvinyl chloride resin sheet 21 was pasted through the medium of a vinyl chloride resin type adhesive 24, a backing paper 25 for a wall paper with a brown-colored face (manufactured and sold by Kohjin Co., Ltd., Japan. Trade name: WK-80, 80 g/m²) to obtain a composite material.

The thus obtained composite material was irradiated over the side of the heat-shrinkable polyvinyl chloride resin sheet 21 with a near infrared ray 26 (having a peak of spectral distribution at 1.03 $\mu$) at an irradiation speed of 14 cm/sec. using a bar type infrared ray tungusten filament lamp (the same as in Example 1). As a result, the pictures 22 of the duct groove portions were caused to cave in, thereby to form concaves 27 which were colored with a color of the pictures 22. Thus, there was obtained a desired three-dimensionally decorated, laminated structure.

The substantially same procedure as described above was repeated except that in place of the backing paper 25 with a brown-colored surface for a wall paper, a polyester sheet (manufactured and sold by Toray Ind., Inc. Trade name: Lumirror. Thickness: 50 $\mu$) was employed, thereby to obtain the substantially same three-dimensionally decorated laminated structure as above-described. In employing said polyester sheet, a near infrared ray was not irradiated over the side of the heat-shrinkable film, but over the side of the polyester sheet at an irradiation speed of 12 cm/sec. As a result, there was obtained a three-dimensionally decorated, laminated structure having the similar effect to the above.

EXAMPLE 3

Referring to FIG. 20, a solid pattern was gravure-printed, to form a light brown-colored layer 32, using a light brown ink composition containing as a vehicle a vinyl chloride resin on a paper of fine quality 31 (manufactured and sold by Kokusaku Pulp Co., Ltd. Trade name: KRS. 46.5 g/m²). Then, the pictures 33 of the duct groove portions of the pattern of grains of wood and another pattern 34 of grains of wood were printed on the layer 32 by the same printing method employing the same ink composition. On the thus obtained layer 32 of said paper 31 was pasted, through the medium of a vinyl acetate type resin adhesive 36, a heat-shrinkable polyvinyl chloride resin sheet 35 (manufactured and sold by Mitsubishi Plastics Ind., Ltd. Trade name: HI-SHIREX-MB. Thickness: 30 $\mu$) to obtain a composite material.

Thus obtained composite material was irradiated, over the side of the heat-shrinkable sheet 35, with a near infrared ray 37 under a pressure of a press at an irradiation speed of 9.8 cm/sec. using a heating type copying machine (manufactured and sold by Duplo Manufacturing Co. Trade name: Duplo Fax F-800). As a result, there was obtained a three-dimensionally decorated, laminated structure having concaves 38 on the heat-shrinkable polyvinyl chloride resin sheet 35 corresponding to the pictures 33 of the duct groove portions.

EXAMPLE 4

Referring to FIG. 21, the pictures 42 of the duct groove portions of the pattern of grains of wood were printed on a surface of a heat-shrinkable polypropylene sheet 41 (manufactured and sold by Kohjin Co., Ltd. Trade name: POLYSET Thickness: 30 $\mu$) using a black ink composition containing as a vehicle a polyamide type resin. On the other hand, the pattern 43 of grains of wood coordinating with the above-mentioned pictures 42 was gravure-printed on the back of the heat-shrinkable polypropylene sheet 41, using a brown ink composition containing the same vehicle as described above.

Then, on the back face of the heat-shrinkable polypropylene sheet 41 printed with the pattern 43 was pasted, through the medium of a ethylene-vinyl acetate type adhesive 45, a cardboard 44 with a light brown-colored surface (manufactured and sold by Kohjin Co., Ltd. Trade name: WK-130. 130 g/m²) to obtain a composite material.

The thus obtained composite material was irradiated, over the side of the heat-shrinkable polypropylene sheet 41, with a near infrared ray 46 at an irradiation speed of 6.3 cm/sec. using the same heating type copying machine as in Example 3. This, there was obtained a three-dimensionally decorated, laminated structure having concaves 47 corresponding to the above-mentioned pictures 42 of the duct groove portions and colored with a color of the pictures 42.

The procedure was repeated except that the cardboard 44 was pasted on the face of the heat-shrinkable polypropylene sheet 41 printed with the pictures 42 of the duct groove portions to obtain a composite material, instead of the back face of the sheet 41 printed with pattern 43. Then the thus obtained composite material was irradiated, over the side of the heat-shrinkable sheet 41, with a near infrared ray 46 at an irradiation speed of 5.5 cm/sec. using the same heating type copying machine as above mentioned. As a result, there was obtained a three-dimensionally decorated, laminated structure having concaves in portions of the face of the heat-shrinkable polypropylene sheet 41 corresponding to the pictures 42 of the duct groove portions and colored with a color of the pictures 42.

EXAMPLE 5

Referring to FIG. 22, a solid pattern was gravure-printed, using a brown type ink composition containing as a vehicle a vinyl chloride-vinyl acetate copolymer type resin, to form a brown-colored layer 52, on a backing paper 51 for a wall paper (manufactured and sold by Kohjin Co., Ltd. Trade name: KOHJIN WK-80. 80 g/m²). Then, on the thus obtained layer 52 of the backing paper 51 was pasted, through the medium of ethylene-vinyl acetate type resin adhesive 54, a heat-shrinkable polyvinyl chloride resin sheet 53 (manufactured and sold by Nippon Carbide Ind. Co. Ltd., Japan, Trade name: Hi-S Film No. 111 L3. Shrinkage rate: longitudinally 5%, laterally 50%. Thickness 40$\mu$). Then, the pictures 55 of the duct groove portions of the pattern of grains of wood and another pattern 56 of grains of wood were printed, in the same method as in Example 1, on the face of the pasted heat-shrinkable polyvinyl chloride resin sheet 53 to obtain a composite material.

The thus obtained composite material was irradiated, over the side of said printed face, with a near infrared ray 57 at an irradiation speed of 10cm/sec. employing the same heating type copying machine as in Example 3 to obtain a three-dimensionally decorated, laminated structure having the similar concaves 58 and the similar effect to that obtained in Example 1.

The substantially same procedure as described above was repeated except that, in place of the abovementioned heat-shrinkable polyvinyl chloride resin film 53, there was employed a heat-shrinkable polyvinylidene chloride resin film, polyester type resin film, polyamide type resin film, polystyrene type resin film, polyethylene type resin film or polypropylene type resin to obtain a three-dimensionally decorated, laminated structure having the similar concaves and the similar effect to that obtained in the above.

Moreover, the substantially same procedure was repeated except that, in place of the backing paper 51 for a wall, there was employed a brown-colored aluminum foil, an asbestos paper or a colored polyvinyl chloride film to obtain a three-dimensionally decorated, laminated structure having the similar effect to that obtained in the above.

Furthermore, the composite material was, prior to irradiation with a heat ray to form concaves, coated, on its printed surface, with a coating material comprising a solution of an acrylic type resin (manufactured and sold by Rohm und Haas. Trade name: PALALOID B-66) and 5% by weight of silica as a delustering agent (manufactured and sold by Fuji Davison Chem. Co., Ltd. Trade name: SYLOID 308) dispersed therein, whereby the composite material having on its surface a transparent, delustered overcoat layer was obtained. Subsequently, the thur obtained composite material with its surface overcoated was irradiated, over its overcoated face, with a near infrared ray at an irradiation speed of 11 cm/sec. employing the same heating type copying machine as in the above to cause the pictures of the duct groove portion to cave in together with the transparent overcoat at its portion corresponding to said pictures, thereby to form colored concaves. Thus, a three-dimensionally decorated, laminated structure.

Furthermore, after the composite material without its surface overcoated was irradiated with a heat ray to form concaves, the composite material having the concaves was coated, on its surface, with the same coating material as mentioned above by a spray-coating method. Thus, there was obtained a three-dimensionally decorated, laminated structure with a transparent, delustered overcoat layer.

EXAMPLE 6

Referring to FIG. 23, a heat-shrinkable, light yellow-colored polyethylene resin film 61 (manufactured and sold by Dai Nippon Jushi Co., Ltd. Trade name: POLY-ETHYLENE SHRINK FILM. Shrinkage rate: longitudinally 50%, laterally 50%. Thickness: $30\mu$) and an aluminum foil 62 was pasted through the medium of a polyester resin type adhesive 63 by a dry lamination method. On the heat-shrinkable resin film thus laminated was offset, gravure-printed colored figures 64 of an arabesque design, using a dark brown ink composition and then, a gradation design 65 coordinating with said colored figures 64 was offset, gravure printed, using a brown ink composition containing a similar type vehicle to that of the above-mentioned dark brown ink composition. As a result, there was obtained a composite material. Subsequently, the composite material was irradiated, over its printed face, with a near infrared ray 66 in a distance of 3cm. at an irradiation speed of 10cm/sec., employing a bar type infrared ray lamp (manufactured and sold by Ushio Electric Inc. 200V. 1.2KW), whereby the colored figures 64 are caused to cave in and concaves 67 are formed. Thus, a three-dimensionally decorated, laminated structure with concaves 67 colored with a color of the colored figures 64.

EXAMPLE 7

Referring to FIG. 24, the surface of a paper (manufactured and sold by Tokushu Paper Making Co. Trade name: S-VELUM. $80g./m^2$) was formed with solid brown-colored print layer 72 by gravure-printing. On the print lay 72 was gravure-printed a pattern 73 of grains of wood, using a brown ink composition. The face of the pattern 73 of the paper 71 was laminated a heat-shrinkable polyester resin film 74 (manufactured and sold by Mitsubishi Plastics Industries Ltd. Trade name: HS-DIAFOIL. Thickness: $12\mu$) through the medium of a polyester resin type adhesive 75. Then, on the heat-shrinkable film 74 were gravure-printed pictures 76 of duct groove portions of the pattern of grains of wood which pictures coordinate with the pattern of grains of wood 73 formed on the paper 71, using a dark brown ink composition containing as a vehicle a polyester type resin. As a result, there was obtained a composite material. The composite material was irradiated, over the heat-shrinkable resin film 74, with a near infrared ray 77 at an irradiation speed of 4.2 cm/sec., whereby the pictures 76 of said duct groove portions were caused to cave in, to form concaves 78 colored with a color of the pictures 76. Thus, there was obtained a desired three-dimensionally decorated, laminated structure.

Alternatively, the substantially same procedure as in the above was repeated except that the pictures 76 of the duct groove portions were formed, prior to lamination, on the heat-shrinkable resin film 74 and then, the heat-shrinkable resin film with the pictures 76 was laminated on the paper in such a manner that the picture 74 may be coordinated with the pattern 73 of grains of wood to produce a composite material. There was obtained a structure having the similar effect to that of the above.

EXAMPLE 8

Referring to FIG. 25, the pictures 82 of the duct groove portions of the pattern of grains of wood and another pattern 83 of grains of wood were printed, in the same method as in Example 1, on the same heat-shrinkable polyvinyl chloride resin sheet 81 as employed in Example 1. Then, a solid pattern was gravure-printed, using a brown ink composition containing as a vehicle a vinyl chloride resin, on the face of the sheet 81 printed with the pictures 82 and the pattern 83 thereby to form a brown-colored layer 84. On the face of the brown-colored layer 84 of the sheet 81 was laminated, through the medium of a vinyl chloride type adhesive 86, on a backing paper 85 for a wall paper (manufactured and sold by Kohjin Co., Ltd., Japan. Trade name: KOHJIN WK-130. $130g/m^2$) to obtain a composite material.

The thus obtained composite material was irradiated, over the side of the heat-shrinkable sheet 81, with a near infrared ray 87 at an irradiation speed of 9.2cm/sec. using the same heating type copying machine as used in Example 3. As a result, there was obtained a three-dimensionally decorated, laminated structure having the similar concaves 88 and the similar effect to that obtained in Example 2.

Alternatively, before the heat ray was irradiated, the printed face of the composite material was entirely coated with a matting material comprising a solution of an acryl type resin (manufactured and sold by Rohm und Haas. Trade name: PALALOID B-66) and 5% by weight of silica (manufactured and sold by Fuji Davison Chem. Co., Ltd. Japan. Trade name: SYLOID 308) dispersed therein to form a delustered and transparent over-coat layer having a thickness of about 3µ. Then, the thus obtained composite material was irradiated, over said over-coat layer, with a near infrared ray at an irradiation speed of 11cm/sec. using the same heating type copying machine as mentioned above. As a result, the pictures of the duct groove portions were caused to cave in together with the over-coat layer, to form concaves which were colored with a color of the pictures. Thus, there was obtained a desired three-dimensionally decorated, laminated structure.

Further alternatively, the printed face of the composite material which had been irradiated with the heat ray without applying the delustered and transparent over-coat layer was, then, entirely coated, in spray coating method, with a matting material comprising the same acryl type resin solution and 5% by weight of the above-mentioned silica dispersed therein. As a result, there was obtained a three-dimensionally decorated, laminated structure having a delustered and transparent over-coat layer.

Still further alternatively, a vinyl type resin, urethane type resin, cellulose derivatives or the like was employed in place of the above-mentioned acryl type resin to form the similar over-coat layer to the above which was protective over the face and delustered.

EXAMPLE 9

Referring to FIG. 26, the pattern 92 of grains of wood was printed, in the same printing method using the same ink composition as in Example 1, on the same brown-colored heat resistant polyvinyl chloride sheet 91 as employed in Example 1. On the other hand, the pictures 94 of the duct groove portions of the pattern of grains of wood were printed, in the same printing method using the same ink composition as in Example 1, on the same heat-shrinkable polyvinyl chloride sheet 93 as employed in Example 2.

The heat resistant polyvinyl sheet 91 and the heat-shrinkable sheet 93 were laminated, through the medium of a vinyl chloride resin type adhesive 95, on each other so that the pattern 92 and the pictures 94 of the duct groove portions printed on the respective faces contacts and coordinates with each other to obtain a composite material.

The thus obtained composite material was irradiated, over the side of the heat-shrinkable sheet 93, with a near infrared ray 96 at an irradiation speed of 8.3cm/sec. using the same heating type copying machine as in Example 3 thereby to form a three-dimensionally decorated, laminated structure having the similar effect to that obtained in Example 3.

EXAMPLE 10

Referring to FIG. 27, the pictures 102 of the duct groove portions of grains of wood were gravure-printed, using a dark black ink composition containing as a vehicle a vinyl chloride-vinyl acetate copolymer, on a heat-shrinkable polyvinyl chloride resin sheet 101 (manufactured and sold by Mitsubishi Plastics Ind. Ltd., Japan. Trade name: HISHIREX-502, Shrinkage rate: laterally 45 – 50%, Thickness: 40µ). Then, other pictures 102′ of the duct groove portions of the pattern of grains of wood which were different from the above were printed in the same method as above, using an ink composition lighter in color than the abovementioned dark black ink composition. Further, still other pictures 102″ of the duct groove portions of grains of wood were printed in the same method as above, using a dark brown ink composition. Then, on the face of the heat-shrinkable polyvinyl chloride resin sheet 101 was gravure-printed, using a light brown ink composition containing as a vehicle a vinyl chloride-vinyl acetate copolymer, a pattern 103 of grains of wood which coordinates with the abovementioned pictures 102, 102′ and 102″ of the duct groove portions.

On the back face of the heat-shrinkable polyvinyl chloride resin sheet 101 printed with the pattern 103 and the pictures 102, 102′ 102″ was laminated, through the medium of a vinyl chloride-vinyl acetate copolymer type adhesive 104, a creamy-colored heat-resistant polyvinyl chloride sheet 105 (manufactured and sold by Riken Vinyl Ind. Co., Ltd. Trade name: RIKEN FC-4648, Thickness: 100µ) to obtain a composite material.

The thus obtained composite material was irradiated, over the printed face, with a near infrared ray 106 at an irradiation speed of 15.5cm/sec., using a bar type infrared ray tungusten filament lamp as used in Example 1. As a result, the pictures 102, 102′, 102″ of the duct groove portions were caused to cave in to form respective concaves 107, 107′ and 107″ which became stepwise shallower in order and were colored with colors of the pictures 102, 102′ and 102″. Thus, there was obtained a desired three-dimensionally decorated, laminated structure.

The substantially same procedure as described above was repeated except that a backing paper with a creamy-colored surface for a wall paper (manufactured and sold by Kohjin Co., Ltd. Trade name: KOHJIN WK-130, Thickness: 230µ) was employed in place of the heat resistant polyvinyl chloride sheet 105. There was obtained a wall paper having a three-dimensionally decorated face.

Moreover, the substantially same procedure as described above was repeated except that the pattern 103 of grains of wood was firstly applied and then the pictures 102, 102′ and 102″ of the duct groove portions were applied. There was obtained a three-dimensionally decorated, laminated structure having the similar effect to the above.

Furthermore, the substantially same procedure as described above was repeated except that there was employed, in place of the heat-shrinkable polyvinyl chloride resin sheet, a heat-shrinkable polyvinyliden chloride type sheet, polyester type sheet, polyamide type sheet, polystyrene type sheet, polyethylene type sheet or polypropylene type sheet. There was obtained a three-dimensionally decorated, laminated structure having the similar effect to the above.

EXAMPLE 11

Referring to FIG. 28, the picture 112 of the duct groove portions of the pattern of grains of wood were gravure-printed, using a dark black ink composition containing as a vehicle a vinyl chloride-vinyl acetate copolymer, on a heat-shrinkable polyvinyl chloride resin sheet 111 (manufactured and sold by Mitsubishi Plastics Ind. Ltd., Japan. Trade name: HISHIREX-502. Shrinkage rate: laterally 45–50% at 100°C. Thickness: 40µ).

Then, on the back of the heat-shrinkable polyvinyl chloride resin sheet 111 was laminated, through the medium of a vinyl chloride-vinyl acetate copolymer type adhesive 113, a brown-colored heat resistant polyvinyl chloride resin sheet 114 (manufactured and sold by Riken Vinyl Ind. Co. Ltd., Japan. Trade name: RIKEN FILM, CABINET FC-4648. Thickness: $100\mu$).

The thus laminated material was irradiated, over the side of the printed heat-shrinkable polyvinyl chloride resin sheet, with a near infrared ray 115 at an irradiation speed of 16 cm/sec. using the same near infrared ray lamp as used in Example 10. As a result, the pictures 112 of the duct groove portions were caused to cave in, thereby to form concaves 116 which were colored with a color of the pictures 112.

On the composite material thus formed with the concaves 116, the pattern 117 of grains of wood co-ordinating with the above-mentioned pictures 112 of the duct groove portions was gravure-printed, using a brown ink composition containing as a vehicle a vinyl chloride-vinyl acetate copolymer. Thus, there was obtained a desired three-dimensionally decorated, laminated structure.

The substantially same procedure as described above was repeated except that a lining paper with its surface brown-colored (manufactured and sold by Kohjin Co. Ltd., Japan. Trade name: KOHJIN WK-130. Thickness: $230\mu$) for use as a wall paper or an aluminium foil was employed in place of the heat resistant polyvinyl chloride sheet 114. There was obtained a wall paper having a three-dimensionally decorated face.

Furthermore, the substantially same procedure as described above was repeated except that there was employed, in place of the heat-shrinkable polyvinyl chloride film, a heatshrinkable polyvinylidene chloride type film, polyester type film polyamide type film, polystyrene film, polyethylene film or polypropylene film. There was obtained a three-dimensionally decorated, laminated structure having the similar effect to the above.

EXAMPLE 12

Referring now to FIG. 29, the colored figure portions of arabesque design were gravure-printed, using a dark black ink composition containing as a vehicle a vinyl chloride type resin, on a heat-shrinkable polyvinyl chloride sheet 121 (manufactured and sold by Mitsubishi Plastics Ind. Ltd., Japan. Trade name: HI-SHIREX-A. Shrinkage rate: laterally 23 – 28%. Thickness: $40\mu$).

Said heat-shrinkable polyvinyl chloride sheet 121 was laminated, through the medium of a vinyl-chloride-vinyl acetate copolymer type adhesive 125, on a heat resistant polyvinyl chloride sheet 124 with its surface light yellow-colored (manufactured and sold by Kobe Resin Co. Ltd., Japan. Trade name: BONLOID. Thickness: $100\mu$) so that the printed face of the former sheet 121 might about against the colored surface of the latter sheet 124.

The thus obtain laminated material was irradiated, over the side of the printed heat-shrinkable polyvinyl chloride sheet, with a near infrared ray 126 at an irradiation speed of 6 cm/sec. using a heating type copying machine according to the same process as of Example 11. As a result, the colored figure portions 122 were caused to cave in, thereby to form concaves 127 which coincided with said colored figure portions 122.

On the composite material thus formed with the concaves 127, the gradation 128 coordinating with the above-mentioned colored figure portions 122 was gravure-printed, using a green ink composition containing as a vehicle a vinyl chloride type resin. Thus, there was obtained desired three-dimensionally decorated, laminated structure.

EXAMPLE 13

Referring to FIG. 30, the pictures 133 of the duct groove portions of the pattern of grains of wood were gravure-printed, using a black ink composition containing as a vehicle a polyamide type resin, on a cardboard 131 with its surface 132 light brown-colored (manufactured and sold by Kohjin Co. Ltd., Japan. Trade name: KOHJIN WK-130. $130g/m^2$).

On said cardboard 131 was laminated a heat-shrinkable polypropylene sheet 134 (manufactured and sold by Kohjin Co. Ltd., Japan. Trade name: POLYSET. Thickness: $30\mu$), through the medium of an ethylenvinyl acetate copolymer type adhesive 135, to obtain a composite material.

The thus obtained composite material was subjected to irradiation with a near infrared ray 136 at an irradiation speed of 6 cm/sec. using the same heating type copying machine as used in Example 3. As a result, the heat-shrinkable sheet caused to cave in at its portions corresponding to the pictures 133 of the duct groove portions of the pattern of grains of wood, to form concaves 137. The pattern 138 of grains of wood coordinating with the above-mentioned concaves 137 was gravure-printed, using a brown ink composition containing the same vehicle as used for the ink composition on said duct groove portions. Thus, there was obtained a desired decorated, laminated structure.

EXAMPLE 14

Referring to FIG. 31, a heat-shrinkable polyvinyl chloride resin film 141 of a size 10 cm $\times$ 30 cm (manufactured and sold by Nippon Carbide Inds. Co., Ltd., Japan. Trade name: Hi-S film No. 120. Heat shrinkage rate: longitudinally 10% and laterally 57% 140°C. Thickness: $30\mu$) and a polyvinyl chloride resin sheet 142 with its back lined (manufactured and sold by Kohjin Co., Ltd., Japan. Trade name: KOHJIN WK-130. Thickness: $230\mu$) were laminated and pasted to each other through the medium of an ethylene-vinyl acetate copolymer emulsion type adhesive 143 to produce a composite material. Then, the surface of the polyvinyl chloride resin film 141 of the thus obtained composite material was gravure-printed a pattern 144 having portions different with each other in infrared ray absorption rate, using a black ink composition containing a vinyl chloride-vinyl acetate copolymer type binder. The printed pattern 144 was composed of repeating rectangles each having a length of 1.0 mm and a width of 0.5 mm. In printing, the gravure-printing pattern having three steps of depths of print pattern, namely $45\mu$, $20\mu$ and $5\mu$ was employed so that there may occur differences in infrared ray absorption rate. As a result, the resulting printed pattern had different concentrations. Subsequently, the thus obtained composite material was irradiated, over the printed face, with an infrared ray 145, using a heating type copying machine (manufactured and sold by Duplo Manufacturing Co. Trade name: DUPLO FAX F-800) with a small pressure, at an irradiation speed of 7.7 cm/sec. As a result, each portion of the printed pattern 144 was caused to cave in. The depth of the formed concave 146 was varied depending on the temperature due to the infrared absorption of the corresponding portion to the concave. Thus, there were obtained concaves 146 having varied depths. In addition, the concaves 146 were colored according to colors of the printed pattern 144. Naturally, the portion having a print pattern depth of 45μ was caused to form a concave 46 having the greatest depth; and smaller the print pattern depth, the depth of concave becomes shallower. But, all the concaves having varied depths coordinate with one another, and they were colored with colors of the corresponding portions of the printed pattern.

EXAMPLE 15

Referring to FIG. 32, a heat-shrinkable polyvinyl chloride resin film 151 (manufactured and sold by Mitsubishi Plastics Industries Ltd. Trade name: HI-SHIREX. Shrinkage rate: laterally 45 – 50%. Thickness: 40μ) was gravure-printed with a pattern having portions with varied absorption rates for infrared ray, using the same black ink composition as in Example 14. The heat-shrinkable resin film 151 having the printed pattern 152 and a transparent, rigid polyvinyl chloride resin film 153 (manufactured and sold by Kobe Resin Co., Ltd. Trade name: BONLOID. Thickness: 100μ) were laminated, through the medium of a vinyl chloride-vinyl acetate copolymer type adhesive, so that the surface of said film 153 contacted the face of the printed pattern 152 of the film 151. As a result, there was obtained a composite material. The thus obtained composite material was irradiated, on the face of said heat-shrinkable polyvinyl chloride film 151, with an infrared ray 155 under a pressure of press at an irradiation speed of 5.9 cm/sec., using the same heating type copying machine as in Example 14, whereby the film 151 was caused to cave in to form concaves 156, 156′ and 156″ which became stepwise shallower at portions of 45μ, 20μ and 5μ in depth. The above-mentioned concaves 156, 156′ and 156″ were coordinated, in their printed patterns, with one another. Thus, there was obtained a three-dimensionally decorated, laminated structure.

Alternatively, the substantially same procedure as above was repeated except that the irradiation of the infrared ray was made over the face of said transparent, rigid polyvinyl chloride film 153 instead of the face of said heat-shrinkable resin film 151. As a result, there was obtained a decorative, laminated structure having the similar effect to that of the above.

Furthermore, alternatively, the same procedure as in the above was repeated except that on the non-printed face of the heat-shrinkable resin film 151 was laminated the surface of the transparent, rigid resin film 153. There was obtained a structure having the similar effect to that of the above.

EXAMPLE 16

Referring to FIG. 33, in the same manner as in Example 14, on both sides of a heat-shrinkable polyvinyl chloride resin film 161 (manufactured and sold by Nippon Carbide Ind. Co., Ltd., Japan. Trade name: HI-S FILM, No. 111 L3. Shrinkage rate: 50% in lateral direction, 5% in longitudinal direction. Thickness: 40μ) was gravure-printed a pattern 162 having portions different in an infrared ray absorption rate, using a black ink composition containing as a vehicle a polyvinyl chloride type resin. Then, on one side of said film 161 was laminated a rigid polyvinyl chloride resin film 163 (manufactured and sold by Kobe Resin Co., Ltd., Japan. Trade name: BONLOID. Thickness: 100μ) through the medium of a vinyl chloride type adhesive 164 to obtain a composite material. The thus obtained composite material was irradiated, over the side of the polyvinyl chloride resin film 161, with a near infrared ray 165, using the same heating type copying machine as employed in Example 14, under a strong pressure of press at an irradiation speed of 5.9 cm/sec. As a result, at an outer face of the heat-shrinkable polyvinyl chloride resin film 161 to cause the film at its printed portions 162 to cave in, thereby to form concaves 166 each of which varied in depth depending on the difference in infrared ray absorption rates of the portion of said printed pattern 162. The concaves 166 were colored with colors of said printed pattern 162. Alternatively, when the pattern 162 was formed on the opposite side of said film 161, there were formed concaves 166′ each of which was varied in depth depending on the difference of temperature caused by a varied rate of infrared ray absorption of the portion of said printed pattern 162. Each concave 166′ coordinated with the printed pattern 162. Thus, there was obtained a decorative laminated structure having a pattern of embossment.

EXAMPLE 17

Referring to FIG. 34, in the same manner and using the same black ink composition as in Example 14, on a heat resistant, brown-colored polyvinyl chloride resin film 171 was applied a printed pattern 172 having portions different in an infrared ray absorption rate. Then, on the printed pattern 172 of said heat resistant polyvinyl chloride resin film 171 was laminated, through the medium of a polyvinyl chloride type adhesive 174, a heat-shrinkable polyvinyl chloride resin film (manufactured and sold by Mitsubishi Plastics Ind., Ltd., Japan. Trade name: HISHIREX-502. Shrinkage rate: 45–50% in lateral direction. Thickness: 40μ) to obtain a composite material.

The thus obtained composite material was irradiated, over the side of the heat-shrinkable polyvinyl chloride resin film 173, with an infrared ray 175, using the same heating type copying machine as employed in Example 14, under a strong press pressure at an irradiation speed of 7.5 cm/sec. As a result, on the outer face of the heat-shrinkable polyvinyl chloride resin film 173 were formed concaves 176 at portions corresponding to the pictures of the printed pattern 172. Each of said concaves were varied in depth depending on the difference of temperature caused by a varied rate of infrared absorption of the portion of said printed pattern 172 and was coordinating with the printed pattern. There was obtained a decorative laminated structure having a pattern of embossment.

EXAMPLE 18

Referring to FIG. 35, on a heat-shrinkable polyvinyl chloride resin film 181 as same as used in Example 14, were gravure-printed a plurality of geometrical patterns formed of repeating rectangles each having a length of 1.0 mm and a width of 0.5 mm. The depth of print layer of said printed pattern was 30μ. Each of said printed patterns 182, 182′ and 182″ was colored black, dark brown and brown, respectively, using an ink composition containing as a vehicle a polyvinyl chloride resin, so that there were made differences between infrared ray absorption rates.

Then, on the polyvinyl chloride resin film 181 with said printed patterns 182, 182′ and 182″ was laminated, through the medium of a vinyl chloride type adhesive 184, a transparent, rigid vinyl chloride resin film 183 (thickness: 150μ).

The thus obtained composite material was irradiated, using the same heating type copying machine as in Example 14, over the side of the printed patterns 182, 182' and 182'', with an infrared ray under a strong press pressure at an irradiation speed of 4.5 cm./sec. As a result, at a part of the black printing pattern 182 was formed the deepest concave 186, at a part of the dark brown printed pattern 182' was formed a concave 186' shallower than the concave 186, and at a part of the brown printing pattern 182'' was formed the shallowest concave 186''. The concaves 186, 186' and 186'' were coordinating with the printed patterns 182, 182' and 182'', respectively and were colored with colors of the printed patterns 182, 182' and 182''. Thus, there was obtained a decorative laminated structure having a pattern of embossment.

Moreover, in the same manner as described above, instead of irradiating an infrared ray over the side of the printed patterns 182, 182' and 182'', an infrared ray was irradiated over the side opposite to the printed patterns 182, 182' and 182'' under a strong press pressure at an irradiation speed of 4.1 cm./sec. As a result, at a printed pattern portion were formed concaves each of which was varied in depth depending on the difference of temperature caused by a varied rate of infrared ray absorption of the printed pattern. The concaves were colored with colors of said printed patterns. There was obtained a decorative laminated structure having a pattern of embossment.

EXAMPLE 19

Referring to FIG. 36, the picture of the duct groove portions 192 of the pattern of grains of wood were gravure-printed, using a dark black ink composition containing as a vehicle a vinyl chloride-vinyl acetate copolymer, on a heat-shrinkable polyvinyl chloride resin film 191 (manufactured and sold by Mitsubishi Plastics Ind., Ltd., Japan. Trade name: HISHIREX-502. Heat shrinkage rate: 45–50% in lateral direction. Thickness: 40μ). Then, the pattern 193 of grains of wood coordinating with said duct groove portions 192 was gravure-printed, using a brown ink composition containing as a vehicle a vinyl chloride-vinyl acetate copolymer, on the heat-shrinkable polyvinyl resin film 191. Then, on the back of the heat-shrinkable polyvinyl chloride resin film 191 with the pattern 193 of grains of wood and the duct groove portion 192 was laminated, through the medium of a vinyl chloride-vinyl acetate copolymer type adhesive 195, a brown-colored, heat resistant polyvinyl chloride sheet 194 (manufactured and sold by Riken Vinyl Ind., Co., Ltd., Japan. Trade name: FC-4648. Thickness: 100μ) to obtain a composite material. The thus obtained composite material was irradiated, over the side of the printed heat-shrinkable polyvinyl chloride resin film, with a near infrared ray 196 at an irradiation speed of 9.2 cm./sec., using a bar type tungusten filament lamp containing therein a halogen gas (manufactured and sold by Iwasaki Electric Co., Ltd., Japan. 200V, 1.5KW). As a result, the pictures of the duct groove portions 192 were caused to cave in, thereby to form concaves 197 which were colored with colors of the pictures 192. Thus, there was obtained a three-dimensionally decorated, laminated structure. The thus obtained decorative laminated structure was subjected to a high temperature heat-fixation treatment in a hot blast furnace 199 at a temperature of 140°C. for 20 seconds, while fixing both ears of said decorative laminated structure by means of clips 198. As a result, the remaining heat-shrinkable rate of the heat-shrinkable polyvinyl chloride resin film 191 could be lowered to 15%.

The substantially same procedure as described above was repeated except that a backing paper with its surface colored brown (manufactured and sold by Kohjin Co., Ltd., Japan. Trade name: WK-130. Thickness: 230μ) for use as wall paper was employed in place of the heat resistant polyvinyl chloride sheet 194. There was obtained a wall paper having a three-dimensionally decorated face and having a heat resistant property.

Moreover, the substantially same procedure as described above was repeated except that a transparent polyvinyl chloride film (manufactured and sold by Kobe Resin Co., Ltd., Japan. Trade name: BONLOID. Thickness: 100μ) was employed to be laminated on the base 194 to obtain a composite material, which was irradiated, over the side of the polyvinyl chloride film of the base 194, with the heat ray at an irradiation speed of 8.3 cm./sec. There was obtained a three-dimensionally decorated, laminated structure having the similar effect to the above.

Furthermore, the substantially same procedure as described above was repeated except that a heat-shrinkable film was firstly pasted with the base and then, on the surface of said heat-shrinkable film were printed the duct groove portions and the pattern of grains of wood. There was obtained a desired product having the similar effect to the above.

EXAMPLE 20

On the surface of a heat-shrinkable polypropylene film (manufactured and sold by Kohjin Co., Ltd., Japan. Trade name: POLYSET. Heat shrinkage rate: 10%. Thickness: 30μ) was gravure-printed, using a black ink composition containing as a vehicle a polyamide type resin, colored figures of an arabesque design. Then, on the back of the heat-shrinkable resin film was gravure-printed, using a green ink composition containing as a vehicle a polyamide type resin, a gradation print coordinating with said colored figures.

Then, on said gradation-printed side of the heat-shrinkable resin film was laminated a thick paper (manufactured and sold by Kohjin Co., Ltd., Japan. Trade name: WK-130, 130 g./m²) with its surface colored light yellow, through the medium of an ethylene-vinyl acetate type adhesive, to obtain a composite material. Then, the thus obtained composite material was irradiated, over the side of said heat-shrinkable film, with a near infrared ray, using the same heating type copying machine as in Example 14, at an irradiation speed of 6.3 cm./sec. As a result, the colored figure portions were caused to cave in, thereby to form concaves which were colored with colors of said colored figure portions. Thus, there was obtained a three-dimensionally decorated, laminated structure.

Then, in the same manner as in Example 19, the thus obtained decorative laminated structure was subjected to a high temperature heat-fixation treatment in a hot blast furnace at a temperature of 160°C. for 12 seconds, while fixing the size thereof. As a result, the remaining heat-shrinkable rate of the heat-shrinkable polypropylene film could be lowered to 4% and there was obtained a three-dimensionally decorated, laminated structure having a good thermal property.

The substantially same procedure was repeated except that the heat-shrinkable resin film, the surface of which was applied with a gradation printing and the back of which was applied with a colored figure printing, was laminated on a thick paper at its side having the colored figure print, and was irradiated with a heat ray at an irradiation speed of 5.5 cm./sec., whereby concaves were formed on the surface of the heat-shrinkable resin film at its portions corresponding to said colored figure portions of the back. The thus obtained laminated structure was subjected to a high temperature heat-fixation treatment. There was obtained a three dimensionally decorated, laminated structure.

EXAMPLE 21

Referring to FIG. 37, duct groove portions 212 of grains of wood were gravure-printed, using a dark black ink composition containing as a vehicle a polyester type resin, on a heat-shrinkable polyester film 211 (manufactured and sold by Mitsubishi Plastics Industries Ltd., Japan. Trade name: HS-DIAFOIL. Average heat shrinkage rate: 40%. Thickness: $12\mu$).

Then, a pattern of grains of wood 213 coordinating with said duct groove portions 212 was gravure-printed on the film, using a brown ink composition containing as a vehicle the same type resin as used above. Then, on said film 211 with the pattern of grains of wood 213 and the duct groove portions 212 was laminated a stencil paper 214 with its surface colored brown (manufactured and sold by Tokushu Paper Making Co., Japan. Trade name: S-VELUM. 80 g./m$^2$), through the medium of a polyester resin type adhesive 215, to obtain a composite material.

The thus obtained composite material placed on a heating roll 217 was irradiated, over the side of said heat-shrinkable resin film 211, with a near infrared ray at an irradiation speed of 6.0 cm./sec., using a near infrared ray lamp 216 (manufactured and sold by Ushio Electric Inc., Japan. 200V, 1.2KW.). As a result, there were formed concaves 218 on the surface of the heat-shrinkable film 211 at its portions corresponding to said duct groove portions 212. Said concaves were coordinating with said duct groove portions 212. Further, in the same manner as in Example 19, said composite material was subjected to a high temperature heat-fixation treatment in a hot blast furnace at a temperature of 240°C. for 30 seconds, while fixing both edges thereof. As a result, the remaining heat shrinkage rate of the heat-shrinkable polyester film 211 could be lowered to 1%. Thus, there was obtained a three-dimensionally decorated, laminated structure.

The substantially same procedure as described above was repeated except that, in place of a heat-shrinkable polyester film was employed as a base, a polyester film (manufactured and sold by Toray Inds. Inc., Japan. Trade name: LUMIRROR. Thickness: $50\mu$) to obtain a composite material. The thus obtained composite material was irradiated with a heat ray at an irradiation speed of 5.4 cm./sec. from the opposite side, to wit, over the side of the polyester film, and then subjected to a heat-fixation treatment. There was obtained a three-dimensionally decorated, laminated structure having the same effect to the above.

EXAMPLE 22

The printed face of the composite material obtained in Example 19 was, before applying irradiation of heat ray, coated with a solution of an acrylic type resin (manufactured and sold by Rohm and Haas. Trade name: POLALOID B-66) containing 5% by weight a matting agent of silica (manufactured and sold by Fuji Davison Chem. Co., Ltd., Japan. Trade name: SYLOID 308) dispersed wherein to obtain a composite material having a delustred transparent layer the thickness of which is about $3\mu$.

Then, the thus obtained composite material was irradiated, using the same bar type tungusten filament lamp containing therein halogen gas as in Example 19, with a near infrared ray at an irradiation speed of 11 cm./sec. over the side of the transparent layer of said composite material. As a result, the duct portions were caused to cave in together with the transparent layer, thereby to form concaves which were coordinating with the duct grooved portions and colored. Thus, there was obtained a structure with its surface delustered. The thus obtained structure was subjected to a high temperature heat-fixation treatment. As a result, there was obtained a three-dimensionally decorated, laminated structure with its surface delustered, having a good thermal property.

EXAMPLE 23

On the surface of slick paper (manufactured and sold by Kokusaku Pulp Co., Ltd., Japan. Trade name: KRS. 46.5 g./m$^2$) was gravure-printed by solid printing a light brown colored layer, using a light brown ink composition containing as a vehicle a vinyl chloride type resin.

Then, on the thus obtained colored layer of slick paper were gravure-printed duct groove portions of a pattern of grains of wood and the pattern of grains of wood, using the same ink composition as in Example 19. Then, on the printed side of said slick paper was laminated, through the medium of a vinyl acetate resin type adhesive, a heat-shrinkable polyvinylidene chloride resin film (manufactured and sold by Kureha Chemical Ind. Co., Ltd., Japan. Trade name: KREHALON FILM. Heat shrinkage rate: 20%. Thickness: $15\mu$) to obtain a composite material.

The thus obtained composite material was irradiated, over the side of the heat-shrinkable film of said composite material, with a near infrared ray under a strong press pressure at an irradiation speed of 9.8 cm./sec., using a heating type copying machine (manufactured and sold by Duplo Manufacturing Co. Trade name: DUPLO FAX F-800). As a result, on the surface of the heat-shrinkable film were formed concaves at portions corresponding to the duct groove portions.

The thus concaved composite material was subjected to a high temperature heat-fixation treatment in a hot blast furnace at a temperature of 125°C for 15 seconds, while fixing both peripheral edges or ears thereof by means of clips. As a result, the remaining heat-shrinkable rate could be lowered to 7% and there was obtained a three-dimensionally decorated, laminated structure.

EXAMPLE 24

Referring to FIG. 38, on the back of a heat-shrinkable polyvinyl chloride resin film 241 (manufactured and sold by Mitsubishi Plastics Industries Ltd., Japan. Trade name: HISHIREX-L. Shrinkage rate at 100°C.: 3% in longitudinal direction, 25% in lateral direction. Thickness: $40\mu$) were gravure-printed the pictures 242 of duct groove portions of a pattern of grains of wood, using a dark black ink composition containing as a vehicle a vinyl chloride-vinyl acetate copolymer and a pattern 243 of grains of wood coordinating with said duct groove portions 242, using a brown ink composition containing as a vehicle the same copolymer as mentioned above.

On said printed side was laminated, through the medium of a polyurethane isocyanate type adhesive 244, a heat resistant polyvinyl chloride resin sheet 245 colored light brown (manufactured and sold by Sambow Resin Ind. Co., Ltd., Japan. Trade name: KT-6. Thickness: $160\mu$). Then, the surface of said heat-shrinkable polyvinyl chloride resin film 241 or the non-printed face was entirely coated with a matting material comprising a solution of a vinyl chloride-vinyl acetate copolymer and 2% by weight of silica (manufactured and sold by Nippon Aerosil Co., Ltd., Japan. Trade name: AEROSIL TT-600) dispersed therein. Then, there was obtained a laminated material X having a delustered overcoat layer 246.

Then, the thus obtained laminated materrial X was irradiated, over its delustered overcoat layer 246, with a near infrared ray 249 at an irradiation distance of 20mm. at an irradiation speed of 6 m./min., using a bar type near infrared ray lamp 246 having a reflex mirror (manufactured and sold by Ushio Electric Inc., Japan. 200V, 3KW. Peak wave-length: $1.05\mu$), while fixing both edges of the laminated material X with a chain of clips 247 to keep the size thereof unchanged. As a result, the heat-shrinkable polyvinyl chloride resin film 241 was caused to cave in at its portions corresponding to the dark brown picture 242 of the duct groove portions, thereby to form concaves 250. There was obtained a composite material Y.

Further, the thus obtained composite material Y having the concaves 250 was subjected to a heat-fixation treatment for 6 seconds, using a far infrared ray ceramic heater 251 (manufactured and sold by Solidion Co., Ltd., Japan. Trade name: SOLIDION IN-FLUX. 100V, 600W. Peak of spectral distribution: 5 – $50\mu$). As a result, there was obtained a three-dimensionally decorated, laminated structure with its surface delustred, having a good heat resistant property.

In the above procedure, in stead of forming a delusterd overcoat layer 246, the surface of the heat-shrinkable polyvinyl chloride resin film may be mechanically treated in advance to form fine concaves and convexes thereon, thereby to impart to said film a delustered effect; or the heat-shrinkable polyvinyl chloride resin film may be mixed with fillers such as silica, etc. to impart to said film a delustered effect.

The thus obtained three-dimensionally decorated, laminated structure was laminated on veneer-core laminated board 252 the thickness of which was 9 mm., through the medium of a ethylene-vinyl acetate emulsion type adhesive (manufactured and sold by Chuo Rika Kogyo Co., Ltd., Japan. Trade name: BA-1120) to obtain a three-dimensionally decorated, laminated structure. Further, on the thus obtained laminated structure was formed V-shaped concaves at desired portions thereof and said V-shaped portions were bent to obtain a cabinet 253. The thus obtained cabinet 253 had the superior pattern of grains of wood and concaves coordinating with said pattern. The obtained product was very excellent in appearance and full of reality.

To the above-obtained vinyl chloride three-dimensionally decorated, laminated structure with the veneer-core plywood laminated thereon and having a thickness of 9 mm. was subjected to a heat-cold repeating test provided for in the Japanese Agricultural Standards (JAS) of Special Plywood. Two test pieces having a square shape of 150 mm. by 150 mm. were cut off from said laminated structure. The pieces were allowed to stand in a thermostat having a temperature range of $80 \pm 3°C$. for 2 hours and then, allowed to stand in a thermostat having a temperature range of $-20° \pm 3°C$ for 2 hours. The above procedure was repeated two times and then the test pieces were allowed to stand till the temperature of the test pieces rose to a room temperature. As a result, on the surface of said pieces, there was caused no cracking, swelling, wrinkles, discoloration nor weight loss. The size of said pieces remained unchanged. It was found that said structure was thoroughly conformed to the standards.

Further, in order to test a heat resistant property of said laminated structure, the same square pieces as employed above were allowed to stand in a thermostat having a temperature range of $80° \pm 3°C$. for one month (720 hours). As a result, there was caused no change and it was found that the laminated structure had an excellent heat resistant property.

Moreover, other physico-chemical tests provided for in Japanese Agricultural Standards of Special Plywood were applied to the laminated structure. As a result, it was found that the present laminated structure was conformed to all standards.

What is claimed is:

1. A method of making a decorative laminated structure having a predetermined surface pattern of convexes and concaves, said concaves being non-perforated and corresponding to picture areas of said laminated structure of a heat-sensitive ink composition containing a heat-absorbing coloring agent; and comprising printing a predetermined pattern of heat-sensitive picture areas on a surface of a heat-shrinkable resin sheet, said heat-sensitive picture areas being a heat-sensitive ink composition containing a heat-absorbing coloring agent; adhering a base sheet to one of the surfaces of said heat-shrinkable resin sheet to form an integral composite material; and irradiating the resultant composite material with an infrared or near infrared heat ray for a sufficient time such that heat energy is preferentially absorbed by said heat-sensitive ink composition causing said heat-shrinkable resin sheet to shrink locally and form non-perforated concaves at areas corresponding to said heat-sensitive picture areas.

2. The method of claim 1 wherein said base is adhered to the surface of said heat-shrinkable resin sheet having said heat-sensitive picture areas thereon.

3. The method of claim 1 wherein said base is adhered to the surface of said heat-shrinkable resin sheet opposite the surface having said heat-sensitive picture areas printed thereon.

4. The method of claim 1 wherein a pattern of heat-insensitive picture areas having a predetermined positional relationship with respect to said heat-sensitive picture areas is printed on a surface of said heat-shrinkable resin sheet or of said base prior to or subsequent to irradiation.

5. A method of making a decorative laminated structure having a predetermined surface pattern of convexes and concaves, said concaves being non-perforated and corresponding to picture areas of said laminated structure of a heat-sensitive ink composition containing a heat-absorbing coloring agent; and comprising printing a predetermined pattern of heat-sensitive picture areas on a surface of a base sheet, said heat-sensitive picture areas being a heat-sensitive ink composition containing a heat-absorbing coloring agent; adhering the thus printed surface of the base sheet to a heat-shrinkable resin sheet to form an integral composite material; and irradiating the resultant composite material with an infrared or near infrared heat ray for a sufficient time such that heat energy is preferentially absorbed by said heat-sensitive ink composition causing said heat-shrinkable resin sheet to shrink locally and form non-perforated concaves at areas corresponding to said heat-sensitive picture areas.

6. The method of claim 5 wherein a pattern of heat-insensitive picture areas having a predetermined positional relationship with respect to said heat-sensitive picture areas is printed on a surface of said heat-shrinkable resin sheet or of said base prior to or subsequent to irradiation.

7. A method of making a decorative laminated structure having a predetermined surface pattern of convexes and concaves, said concaves being non-perforated and corresponding to picture areas of said laminated structure of a heat-sensitive ink composition containing a heat-absorbing coloring agent; and comprising adhering a heat-shrinkable resin sheet to a base sheet to form an integral composite material; printing a predetermined pattern of heat-sensitive picture areas on the heat-shrinkable resin sheet surface of said integral composite material, said heat-sensitive picture areas being a heat-sensitive ink composition containing a heat-absorbing coloring agent; and irradiating the thus printed integral composite material with an infrared or near infrared heat ray for a sufficient time such that heat energy is preferentially absorbed by said heat-sensitive ink composition causing said heat shrinkable resin sheet to shrink locally and form non-perforated concaves at areas corresponding to said heat-sensitive picture areas.

8. The method of claim 7 wherein a pattern of heat-insensitive picture areas having a predetermined positional relationship with respect to said heat-sensitive picture areas is printed on a surface of said heat-shrinkable resin sheet or of said base prior to or subsequent to irradiation.

9. The method of claim 1 wherein said integral composite material is coated with an overcoat layer prior to or subsequent to irradiation.

10. The method of claim 5 wherein said integral composite material is coated with an overcoat layer prior to or subsequent to irradiation.

11. The method of claim 7 wherein the printed integral composite material is coated with an overcoat layer prior to or subsequent to irradiation.

12. The method of claim 11 wherein said overcoat layer comprises a resin and a filler.

13. The method of claim 11 wherein said overcoat layer comprises a resin and a filler.

14. The method of claim 12 wherein said overcoat layer comprises a resin and a filler.

15. The method of claim 1 wherein said heat-shrinkable resin sheet is a thermoplastic resin sheet uniaxially or biaxially stretched and having a heat shrinkability.

16. The method of claim 5 wherein said heat shrinkable resin sheet is a thermoplastic resin sheet uniaxially or biaxially stretched and having a heat shrinkability.

17. The method of claim 7 wherein said heat-shrinkable resin sheet is a thermoplastic resin sheet uniaxially or biaxially stretched and having a heat shrinkability.

18. The method of claim 15 wherein the thermoplastic resin sheet is a sheet of a member selected from the group consisting of polyvinyl chloride resins, polyvinylidene chloride resins, polyolefin resins, polystyrene resins, polyester resins, polyamide resins, polycarbonate resins, polyvinyl resins, cellulose resins and rubber resins.

19. The method of claim 16 wherein the thermoplastic resin sheet is a sheet of a member selected from the group consisting of polyvinyl chloride resins, polyvinylidene chloride resins, polyolefin resins, polystyrene resins, polyester resins, polyamide resins, polycarbonate resins, polyvinyl resins, cellulose resins and rubber resins.

20. The method of claim 17 wherein the thermoplastic resin sheet is a sheet of a member selected from the group consisting of polyvinyl chloride resins, polyvinylidene chloride resins, polyolefin resins, polystyrene resins, polyester resins, polyamide resins, polycarbonate resins, polyvinyl resins, cellulose resins and rubber resins.

21. The method of claim 1 wherein the base sheet is a material capable of adhering to the heat-shrinkable resin sheet through the medium of an adhesive.

22. The method of claim 5 wherein the base sheet is a material capable of adhering to the heat-shrinkable resin sheet through the medium of an adhesive.

23. The method of claim 7 wherein the base sheet is a material capable of adhering to the heat-shrinkable resin sheet through the medium of an adhesive.

24. The method of claim 1 comprising the further step of heat-treating the laminated structure at an elevated temperature while fixing the peripheral ends of the structure to effect heat fixation in the heat-shrinkable resin sheet to reduce the heat shrinkability thereof.

25. The method of claim 5 comprising the further step of heat-treating the laminated structure at an elevated temperature while fixing the peripheral ends of the structure to effect heat fixation in the heat-shrinkable resin sheet to reduce the heat shrinkability thereof.

26. The method of claim 7 comprising the further step of heat-treating the laminated structure at an elevated temperature while fixing the peripheral ends of the structure to effect heat fixation in the heat-shrinkable resin sheet to reduce the heat shrinkability thereof.

27. The method of claim 24 wherein said heat treatment is carried out at a temperature higher than the shrinkage-initiating temperature and the second transition point of the heat-shrinkable resin sheet but lower than the melting point thereof.

28. The method of claim 25 wherein said heat treatment is carried out at a temperature higher than the shrinkage-initiating temperature and the second transition point of the heat-shrinkable resin sheet but lower than the melting point thereof.

29. The method of claim 26 wherein said heat treatment is carried out at a temperature higher than the shrinkage-initiating temperature and the second transition point of the heat-shrinkable resin sheet but lower than the melting point thereof.

30. The method of claim 24 wherein said heat treatment is carried out at a temperature higher than the temperature at which the heat-shrinkable resin sheet was stretched at the time of preparation thereof.

31. The method of claim 25 wherein said heat treatment is carried out at a temperature higher than the temperature at which the heat-shrinkable resin sheet was stretched at the time of preparation thereof.

32. The method of claim 26 wherein said heat treatment is carried out at a temperature higher than the temperature at which the heat-shrinkable resin sheet was stretched at the time of preparation thereof.

* * * * *